United States Patent Office 3,384,543
Patented May 21, 1968

3,384,543
7α-METHYL-5-ANDROSTANES
J Allan Campbell and John C. Babcock, Kalamazoo,
Mich., assignors to The Upjohn Company, Kalamazoo,
Mich., a corporation of Delaware
No Drawing. Filed Apr. 7, 1965, Ser. No. 446,436
15 Claims. (Cl. 167—65)

ABSTRACT OF THE DISCLOSURE

This invention relates to novel steroid compounds, especially to 7α-methyl-5 (α and β)-androstanes, the 2α-methyl derivatives thereof and the 19-nor counterparts of the foregoing.

---

The compound of the present invention and the processes for their production are illustratively represented by the following sequence of formulae:

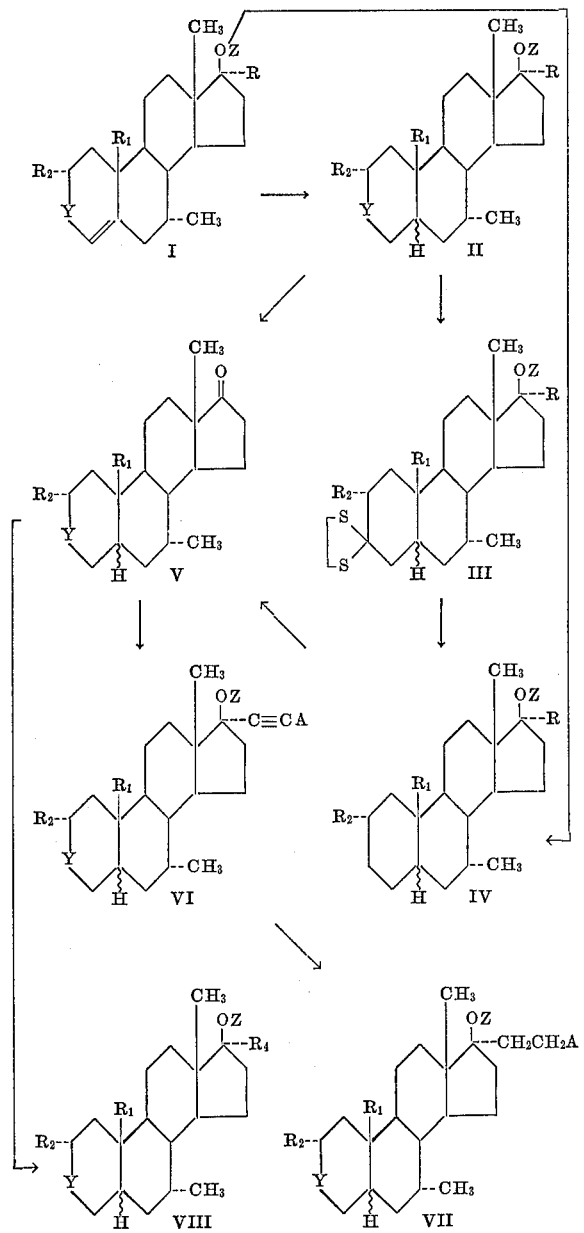

wherein ~ is a generic expression denoting α- and β-bonds and mixtures thereof; R, $R_1$ and $R_2$ are selected from the group consisting of hydrogen and methyl; $R_4$ is a lower alkyl radical containing from one to twelve carbon atoms, inclusive; Z is selected from the group consisting of hydrogen, and the lower acyl radical of an organic carboxylic acid containing from one to twelve carbon atoms, inclusive; Y is selected from the group consisting of the methylene radical (>$CH_2$), the carbonyl radical

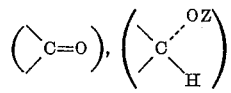

Z having the same meaning as above; A is selected from the group consisting of hydrogen, lower alkyl of from one to twelve carbon atoms, inclusive, chlorine, bromine and trifluoromethyl; the symbol

represents a thioketal radical of the formula

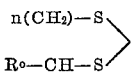

wherein $n$ is selected from the integers one and two and $R^o$ is selected from the group consisting of hydrogen and a lower alkyl radical containing from one to six carbon atoms, inclusive. In examples relating to the 3-thioketals the specific ketal used is the cyclic 3-(ethylene-mercaptole) also named as a cyclic 3-(ethylene dithioketal). For brevity, these are referred to as the 3-thioketal.

The compounds of the invention are prepared from the known 7α-methyl - 4 - androstene starting materials of Formula I, which are synthesized in the manner described in J. Amer. Chem. Soc. 81, 4069. The corresponding 2α,7α-dimethyl compounds (I) are produced in accordance with the procedure of U.S. Patent 2,923,720.

The starting materials of Formula I are readily reduced by known methods to the corresponding 7α-methyl (2α,7α-dimethyl, 7α,17α-dimethyl and 2α,7α,17α-trimethyl) - 3(α and β) - hydroxy - 5(α and β)-androstanes (II). These methods can be employed to produce the 3α-hydroxy - 5α - androstanes, 3β - hydroxy - 5α-androstanes, 3α-hydroxy - 5β - androstanes and 3β - hydroxy-5β - androstanes embrased by Formula II.

The α,β - unsaturated ketones (I) can be reduced with metal (preferably lithium) in ammonia to yield the corresponding 3 - keto - 5α-androstanes (II) and the reduction stopped at this stage if reagents such as t-butyl alcohol or ammonium chloride are employed at the end of the reaction (in the manner described in J. Amer. Chem. Soc., 81, 2386 for the conversion XX→XXV). The same publication shows that continued treatment following the addition of methanol instead of t-butyl alcohol or ammonium chloride, leads directly to the saturated 3β-hydroxy - 5α - androstanes (II'). For example, if the reduction of a compound such as 7α-methyl-17β-hydroxy - 4 - androstene-3-one (I), e.g., with lithium in ammonia, is discontinued at the point where 7α-methyl - 17β - hydroxy - 5α - androstan - 3 - one (II) is formed, the ketone (II) can be further reduced (e.g., with sodium borohydride) to yield 7α - methyl - 3β,17β-dihydroxy - 5α - androstane (II'). On the other hand, the reduction of a 3-keto - 4 - androstene (I) directly to the corresponding 3β - hydroxy - 5α - androstane (II'), without isolation of the 3-keto-5α-androstan-3-one (II), can be carried out in accordance with the above-noted publication.

The 3-keto - 7α - methyl (and 2α,7α-dimethyl) - 5α-androstanes (II) can be reduced to yield a mixture of 3 (α and β)-hydroxy-5α-androstanes (II'). For example, treating a 7α - methyl - 17β - hydroxy-5α-androstan-3-one 17 - acylate (II) with lithium aluminum tri-t-butoxyhydride in a solvent (e.g., tetrahydrofuran) yields a corresponding 7α-methyl - 3α,17α - dihydroxy-5α-androstan 17-acylate (II') and a corresponding 7α - methyl-3β,17α-dihydroxy-5α-androstan 17-acylate (II').

Most of the metal (lithium) - ammonia reductions of the 3 - keto - 4 - androstenes (I) are conducted in the presence of co-solvents such as ether, dioxane or tetrahydrofuran.

Conversion of the compounds of Formula I to a variety of 3 (α and β) hydroxy-5α-androstanes can be carried out by procedures known in the steroid art. For example, after reduction of a compound of Formula I, such as a 7α-methyl-17β-hydroxy-4-androsten-3-one (I), e.g., with lithium in ammonia in a solvent such as tetrahydrofuran, to yield a compound of Formula II, such as a corresponding 7α-methyl-17β-hydroxy-5α-androstan-3-one (II), the thus produced compound (II) is treated with a reducing agent to obtain compounds such as a corresponding 7α-methyl-3α,17β-dihydroxy-5α-androstane (IIα) and a corresponding 7α - methyl - 3β,17β-dihydroxy-5α-androstane (IIβ).

The conversion of the 3-ketones of Formula II to the corresponding 3 (α and β) alcohols (IIα and IIβ) is carried out using a reducing agent, for example, lithium tri-t-butoxyhydride, lithium aluminum triethoxyhydride, sodium borohydride, potassium borohydride, diborane, and the like, in an inert organic solvent, for example, tetrahydrofuran, ether, diethyleneglycol dimethyl ether, and the like. Advantageously, the reaction is carried out at temperatures of from 0° to 100° C. for from about ¼ to about 2 hours, with a temperature of 25° C. for about ½ hour being preferred. The compounds of Formulae IIα and IIβ are recovered following their formation by fractional crystallization, chromatography of the total crude reaction product on acid washed alumina, Florisil (synthetic aluminum silicate), silica gel (precipitated silicic acid granules), or silicic acid, with elution by commercial hexanes containing increasing amounts of acetone or benzene containing increasing amounts of methanol, Craig countercurrent partition separation, column partition chromatography, preparative paper chromatography, thin-layer chromatography, or a combination of these methods.

The conversion of the compounds of Formulae IIα, such as a 7α-methyl-3α,17β-dihydroxy-5α-androstan 17 acylate, and IIβ, such as a 7α-methyl-3β,17β-dihydroxy-5α-androstan 17 acylate, to the corresponding 17β-alcohols, such as 7α-methyl-3α,17β-dihydroxy-5α-androstane and 7α-methyl-3β,17β-dihydroxy-5α-androstane, is carried out according to procedures well known in the art for the conversion of androstane 17-acylates to androstane 17-alcohols, e.g., as shown in U.S. Patent 2,849,464.

A compound of Formula IIβ, such as a 7α-methyl-3β,17β-dihydroxy-5α-androstane 17-acylate (IIβ), can be transformed to a corresponding 3α-hydroxy-17-ketone (IIβ$_6$) such as 7α-methyl-3α-hydroxy-5α-androstan-17-one by the five following reactions:

(1) It is first converted to its 3-tosylate by reacting it with an o-, m- or p-toluenesulfonyl halide, preferably p-toluenesulfonyl chloride, in the presence of a weak base, such as pyridine, collidine, dimethylaniline, and the like, to obtain compounds such as 7α-methyl-3β,17β-dihydroxy-5α-androstane 3-tosylate 17-acylate (IIβ$_1$). The reaction is carried out at a temperature of from about 10° to 50° C. for from about 2 to 50 hours. The compounds of Formula IIβ$_1$ are recovered from the reaction mixture by conventional methods, such as, for example, dilution of the reaction mixture with water, extraction with a water immiscible solvent, such as methylene chloride, ethyl acetate, benzene, toluene, and the like, or any of the methods described in the immediately preceding paragraph.

(2) The 3-tosylate 17-acylate (IIβ$_1$) is converted to the corresponding 3-tosylate 17-alcohol (IIβ$_2$) by treating the compounds of Formula IIβ$_1$, such as 7α-methyl-3β,17β-dihydroxy-5α-androstane 3-tosylate 17-acylate with a Lewis acid, such as hydrochloric, hydrobromic, sulfuric acids, boron trifluoride, and the like, in the presence of an alkanol, such as ethanol, methanol, and the like, to obtain the compounds of Formula IIβ$_2$, such as 7α-methyl-3β,17α-dihydroxy-5α-androstane 3-tosylate. These compounds (IIβ$_2$) are recovered from the reaction mixture according to the procedures of the immediately preceding paragraph, or alternatively, the crude compounds can be used in the subsequent step for oxidation of the 17β-alcohols (IIβ$_2$) to the corresponding 17-ketones (IIβ$_3$) without further purification.

(3) The oxidation of the compounds of Formula IIβ$_2$, such as 7α-methyl-3β,17β-dihydroxy-5α-androstane 3-tosylate, to produce the compounds of Formula IIβ$_3$, such as 7α-methyl-3β-hydroxy-5α-androstane-17-one 3-tosylate, is carried out by reacting the 17β-hydroxy compound (IIβ$_2$) with an oxidizing agent in the presence of an organic solvent. Suitable oxidizing agents are chromic anhydride—pyridine complex, chromic anhydride/sulfuric acid, sodium dichromate, and the like, and suitable solvents are pyridine, acetone, acetic acid, acetone—water, and the like, with chromic anhydride-pyridine complex being preferred. The reaction is carried out at temperatures of about 0° to about 50° C. for about 2 to about 20 hours. The compounds of Formula IIβ$_3$ are recovered from the reaction mixture by the methods described above for the recovery of the compounds of Formula IIβ$_1$.

(4) The compounds of Formula IIβ$_3$, such as 7α-methyl-3β-hydroxy-5α-androstane-17-one 3-tosylate, are treated with dimethylformamide at a temperature of about 80° to about 85° C. for from about 2 to about 5 days to produce a mixture of the compounds of Formula IIβ$_4$, such as 7α-methyl-5α-androst-2-en-17-one, and Formula IIβ$_5$, such as 7α-methyl-3α-hydroxy-5α-androstan-17-one 3-formate. In those instances where the 3-formylation proceeds less readily, i.e., wherein R$_2$ is alkyl, in addition to dimethylformamide the compounds of Formula IIβ$_3$ are treated with an alkali metal formate, such as sodium, potassium or lithium formate, at a temperature of about 60° to about 220° C. for about 2 to about 70 hours to give a mixture of compounds such as 2α,7α-dimethyl-5α-androstan-2-en-17-one (IIβ$_4$) and 2α,7α-dimethyl-3α-hydroxy-5α-androstan-17-one 3-formate (IIβ$_5$).

(5) The mixture comprising the compounds of Formula IIβ$_4$, such as 7α-methyl-5α-androst-2-en-17-one, and Formula IIβ$_5$, such as 7α-methyl-3α-hydroxy-5α-androstan-17-one 3-formate, is subjected to chromatography (e.g., over a column of alumina during which procedure the compounds of Formula IIβ$_5$ are converted to the compounds of Formula IIβ$_6$, such as 7α-methyl-3α-hydroxy-5α-androstan-17-one (7α-methylandrosterone), while the compounds of Formula IIβ$_4$ remain unchanged. The chromatography also brings about the separation of the compounds of Formulae IIβ$_4$ and IIβ$_6$ from each other. The compounds of Formulae IIβ$_4$ and IIβ$_6$ can be further purified by the methods described above, e.g., further chromatography, recrystallization, and the like.

A compound for Formula IIα, such as 7α-methyl-3α,17β-dihydroxy-5α-androstane 17-aceylate (IIα) can be transformed to a corresponding 17-ketone (IIα$_4$) by the four following reactions:

(1) The conversion of compound of Formula IIα, such as 7α-methyl-3α-17β-dihydroxy-5α-androstane 17-acylate, to the compounds of Formula IIα$_1$, such as 7α-methyl-3α,17β-dihydroxy-5α-androstane 3-dihydropyranyl ether 17-acylate (IIα$_1$) is carried out by reacting a corresponding compound of Formula IIα with dihydropyran in the presence of a Lewis acid, such as boro trifluoride etherate, p-toluenesulfonic acid, sulfuric acid, zinc chloride, phosphorus oxychloride, and the like. Advantageously, the reaction can be carried out in an organic solvent, such as ether, benzene, and the like. The reaction is carried out at temperatures of from about 0° to about 80° C., with a temperature of 25° C. being preferred. The thus obtained compounds of Formula $II\alpha_1$ are recovered from the reaction mixture by conventional methods such as, for example, dilution of the reaction mixture with a water immiscible solvent, such as methylene chloride, ethyl acetate, benzene, toluene, and the like, or any of the methods described above for the recovery of the compounds of Formulae $II\alpha$ and $II\beta$. Alternatively, the entire crude product obtained in this reaction (1) can be used in the subsequent hydrolysis of step (2).

(2) The hydrolysis of the compounds of Formula $II\alpha_1$, such as $7\alpha$-methyl-$3\alpha,17\beta$-dihydroxy-$5\alpha$-androstane 3-dihydropyranyl ether 17-acylate, to the compounds of Formula $II\alpha_2$, such as $7\alpha$-methyl-$3\alpha,17\beta$-dihydroxy-$5\alpha$-androstane 3-dihydropyranyl ether, is carried out in an alkaline aqueous medium using relatively water soluble alkali metal carbonates, alkaline earth metal carbonates, alkali metal hydroxides, alkaline earth hydroxides, e.g. sodium or potassium carbonate, sodium or potassium hydroxide, calcium hydroxide, and the like, preferably potassium carbonate. Advantageously, there is added to the alkaline aqueous medium an inert water-miscible organic solvent, such as methanol, ethanol, isopropyl alcohol, and the like, with methanol being preferred. The reaction is carried out at temperatures of about 10° to about 100° C. for from about 1 to about 20 hours. The compounds of Formula $II\alpha_2$ are recovered from the reaction mixture by the methods described above for the recovery of the compounds of Formula $II\alpha_1$.

(3) The oxidation of the compounds of Formula $II\alpha_2$, such as $7\alpha$-methyl-$3\alpha,17\beta$-dihydroxy-$5\alpha$-androstane 3-dihydropyranyl ether to the compounds of Formula $II\alpha_3$, such as $7\alpha$-methyl-$3\alpha$-hydroxy-$5\alpha$-androstan-17-one 3-dihydropyranyl ether, is carried out by reacting the starting steroid ($II\alpha_2$) with an oxidizing agent in an organic solvent. Suitable oxidizing agents are chromic anhydride-pyridine complex, chromic anhydride/sulfuric acid, sodium dichromate, and the like; suitable solvents are pyridine, acetone, acetic acid, acetone-water, and the like, with chromic anhydride-pyridine complex being preferred. The reaction is carried out at temperatures of from about 0° to about 50° C. for from about 2 to about 20 hours. The compounds of Formula $II\alpha_3$ are recovered from the reaction mixture by the methods described above for the recovery of the compounds of Formula $II\alpha_1$. Alternatively, the crude compounds of Formula $II\alpha_3$ can be used in the subsequent step, namely, the removal of the dihydropyranyl ether group, without further purification.

(4) The removal of the tetrahydropyranyl group is carried out by treating the compounds of Formula $II\alpha_3$, such as $7\alpha$-methyl-$3\alpha$-hydroxy-$5\alpha$-androstan-17-one 3-dihydropyranyl ether, with an acid in an organic solvent to obtain the compounds of Formula $II\alpha_4$, such as $7\alpha$-methyl-$3\alpha$-hydroxy-$5\alpha$-androstan-17-one. Preferably the acid is a mineral acid, such as hydrochloric, hydrobromic, or sulfuric acids, and the like. Suitable solvents are acetone-water, methanol-water, dimethylsulfoxide-water, dimethylformamide-water, and the like. The reaction is conveniently carried out at temperatures of from about 10° to about 50° C. for from about 5 to about 50 hours. The compounds of Formula $II\alpha_4$ are recovered from the reaction mixture by the methods described above for the recovery of the compounds of Formula $II\alpha_1$.

The $7\alpha$-methyl (and $2\alpha,7\alpha$-dimethyl)-3-keto-4-androstene compounds of Formula I, wherein the 17-substituent does not contain double or triple bonds, can be converted to the corresponding $5\beta$-androstanes (II) by hydrogenation of the $\Delta^4$-bond. For example, treating a compound such as $2\alpha,7\alpha$-dimethyl-17$\beta$-hydroxy-4-androsten-3-one (I) in a solvent (e.g., 95% ethyl alcohol) in the presence of a catalyst (e.g., 5% palladium on charcoal) with hydrogen until one mole equivalent is consumed, yields a compound such as $2\alpha,7\alpha$-dimethyl-17$\beta$-hydroxy-$5\beta$-androstan-3-one (II). Isolation of the desired compound from the reaction mixture and its subsequent purification is accomplished by methods well known in the art. For example, the catalyst is removed from the reaction mixture by filtration through a bed of Celite (diatomaceous earth), the filtrate concentrated to dryness, chromatographer on an adsorbent column (e.g., Florisil), eluted with solvents such as acetone-Skellysolve B (hexanes) and recrystallized from solvents such as the aforesaid pair of eluents.

The $7\alpha$-methyl (and $2\alpha,7\alpha$-dimethyl)-3-keto-$5\beta$-androstanes of Formula II, wherein the 17-substituent does not contain double or triple bonds, can be converted to the corresponding $3\alpha$-hydroxy-$5\beta$-androstanes (II') by reduction of the 3-keto group. For example, treating a compound such as $2\alpha,7\alpha$-dimethyl-17$\beta$-hydroxy-$5\beta$-androstan-3-one (II) in a solvent (e.g., tetrahydrofuran) with a reducing agent (e.g., lithium aluminum tri-t-butoxyhydride) with agitation (e.g., stirring), yields a compound such as $2\alpha,7\alpha$ - dimethyl - $3\alpha,17\beta$-dihydroxy-$5\beta$-androstane (II'). The reaction mixture containing the desired compounds of Formula II' is stored at low temperature (e.g., $-15°$ C.) for about 18 hours. Dilute acetic acid is added until the inorganic materials are coagulated. The organic phase is decanted, dried over a dehydrating agent such as magnesium sulfate, filtered, concentrated to dryness and recrystallized from solvent to yield the $3\alpha$-hydroxy-$5\beta$-androstane (II'), or, alternatively, purified by chromatography with a Florisil column.

In order to produce the 3-desoxy compounds of Formula IV, wherein the 5-hydrogen atom is $\alpha$-oriented, the compounds of Formula II are first converted to their corresponding 3-thioketal derivatives (III) in the manner of J. Amer. Chem. Soc. 76, 1945, namely, by reaction with an alkanedithiol (such as ethanedithiol) in the presence of an organic acid and a strong Lewis acid catalyst (e.g., boron trifluoride etherate); desulfurization is accomplished by hydrogenation of the 3-thioketal group of the compounds of Formula III (e.g., with sodium metal in liquid ammonia or with hydrogen in the presence of a catalyst such as Raney nickel) to yield a corresponding 3-desoxy compound (IV), such as $7\alpha$-methyl-19-nor-17$\beta$-hydroxy-$5\alpha$-androstane (IV). The corresponding $5\beta$-hydrogen compounds can be prepared in the same manner.

To produce the 3-desoxy-$5\beta$-androstanes of Formula IV, the 4-androstenes of Formula I are first converted to their corresponding 3-thioketal derivatives (III) followed by desulfurization (in the same manner as in the immediately preceding paragraph) to yield a compound such as $7\alpha$-methyl-19-nor-17$\beta$-hydroxy-4-androsten. A thus produced 3-desoxy-$\Delta^4$-steroid can be suspended in a solvent (e.g., 95% alcohol) with a catalyst such as 5% palladium on charcoal, or Adams (platinum dioxide) catalyst, and hydrogenated until one mole equivalent of hydrogen is consumed to yield a compound such as $7\alpha$-methyl-19-nor-17$\beta$-hydroxy-$5\beta$-androstane (IV). The catalyst is filtered off and the filtrate concentrated to dryness. The residue of the $5\beta$-hydrogen compound (IV) is purified by recrystallization or chromatography with a column of Florisil.

Oxidation of the compounds of Formulae II and IV, such as $7\alpha$-methyl-19-nor-17$\beta$-hydroxy-$5\alpha$-androstane-3-one (II), $2\alpha,7\alpha$-dimethyl-17$\beta$-hydroxy-$5\alpha$-androstane (IV) and $7\alpha$-methyl-19-nor-17$\beta$-hydroxy-$5\beta$-androstane (IV), with oxidizing agents such as chromic acid, sodium dichromate, potassium dichromate, and the like, using procedures known in the art, yields $7\alpha$-methyl-19-nor $5\alpha$-androstane-17-one (V), $2\alpha,7\alpha$-dimethyl-$5\alpha$-androstane-3,17-dione (V) and $7\alpha$-methyl-19-nor-$5\beta$-androstan-17-one (V), respectively.

The $7\alpha$-methyl (and $2\alpha,7\alpha$-dimethyl)-3,17-diketo-5($\alpha$ and $\beta$)-androstanes of Formula V, prior to the formation of their corresponding 17$\alpha$-alkynyl and haloalkynyl derivatives (VI), must first be converted to the corresponding 3-enamines, 3-ketals, or 3-enol ethers in order to protect the 3-keto function from reduction. The 3-enamine formation can be accomplished in the manner described in U.S. Patent 2,781,343, namely, by reaction with a secondary cyclic alkyleneamine containing from 5 to 7 ring atoms, inclusive, such as pyrrolidine, piperidine, morpholine, and C-alkyl substituted pyrrolidines, piperidines, and morpholines such as 2,4-dimethylpyrrolidine, 3-propylpiperidine, 2-methylpyrrolidine, 3,4-dimethyl-pyrrolidine, 3-ethylpyrrolidine, 3-isopropylpyrrolidine, 3,3-dimethylpyrrolidine, 2 - methylmorpholine, 3 - methylmorpholine, and the like. Pyrrolidine is the preferred amine for use in the above reaction.

Advantageously, the 3-enamine is prepared by heating the 7α-methyl (and 2α,7α-dimethyl)-5(α and β)-androstane-3,17-diones (V) and the secondary cyclic alkyleneamine together in the presence of a suitable solvent, for example, a lower alkanol such as methanol, ethanol, and the like. The desired 3-enamine generally separates from the reaction mixture and is isolated and dried for a short period before being used without further purification in the next stage of the synthesis.

The 3-enamines of 7α-methyl (and 2α,7α-dimethyl)-5(α and β)-androstane-3,17-diones (V) so obtained are then reacted with an organo alkali metal derivative, for example, the sodium or potassium derivative of the appropriate alkyne. The reaction is carried out preferably in the presence of an anhydrous inert solvent such as dimethylformamide, benzene, dimethylsulfoxide, and the like. The 3-enamines of the 7α-methyl (and 2α,7α-dimethyl)-17α-alkynyl-17β-hydroxy-5(α and β)-androstan-3-ones (VI) so obtained are not generally isolated from the reaction mixture but are hydrolyzed in situ to the free 7α-methyl-(and 2α,7α - dimethyl)-17α-alkynyl-17β-hydroxy-5(α and β)-androstan-3-ones (VI) by treatment with an aqueous solution of a base such as sodium hydroxide, potassium hydroxide, and the like, after first decomposing the reaction mixture with water, ammonium chloride, and the like.

The 7α-methyl(and 2α,7α-dimethyl)-17α-alkynyl-17β-hydroxy-5(α and β)-androstan-3-ones (VI) so obtained can be purified, if desired, by procedures known in the art such as by recrystallization, chromatography, and the like.

The 7α-methyl (and 2α,7α-dimethyl)-17α-alkynyl-17β-hydroxy-5 (α and β)-androstan-3-ones (VI) of the invention can also be prepared by reacting the 3-enamines of the 7α-methyl (and 2α,7α-dimethyl-5 (α and β)-androstane-3,17-diones (V), prepared as described above, with the appropriate alkynylmagnesium halide. The reaction is preferably carried out in the presence of a solvent such as diethyl ether, tetrahydrofuran, and the like. Preferably, the Grignard reagent is employed in an excess of the order of 10 moles per mole of the 3-enamine. The 3-enamines of 7α-methyl (and 2α,7α-dimethyl)-17α-alkynyl-17β-hydroxy-5 (α and β)-androstan-3-ones (VI) so obtained are generally not isolated from the reaction mixture but are hydrolyzed in situ to the free 7α-methyl (and 2α,7α-dimethyl)-17α-alkynyl-17β-hydroxy-5 (α and β)-androstan-3-ones (VI) by the method described above.

In converting the 7α-methyl (and 2α,7α-dimethyl-3,17-diketo-5 (α and β)-androstanes (V) to their corresponding 17α-alkynyl and haloalkynyl derivatives (VI), 3-keto protecting groups in addition to the 3-enamines described above, such as 3-ketals and 3-enol ethers, can be employed. Treatment of a 3-ketal or 3-enol ether of a compound of Formula V with an alkali metal derivative, e.g., an appropriate alkyne or haloalkyne, yields the corresponding 17α-alkynyl derivative, which on hydrolysis gives the corresponding 3-ketone of Formula V. Methods for the preparation of 3-ketals and 3-enol ethers of a variety of 3-keto compounds of the androstane series is described in detail in J. Chem. Soc. 4995 (1962).

The 3-ketones of Formula VI can be reduced to yield the corresponding 3 (α and β)-alcohols in the manner described above for converting the compounds of Formula II to those of Formulae IIα and IIβ.

Oxidation of a compound represented by Formula IV, e.g., 7α-methyl-19-nor-17β-hydroxy-5 (α or β)-androstane (IV) with oxidizing agents such as chromic acid, sodium dichromate, potassium dichromate, etc., employing known procedures, yields the corresponding 17-ketone (V), e.g., 7α-methyl-19-nor-5 (α or β)-androstan-17-one (V).

Since the compounds of Formula V wherein Y=CH$_2$ lack an oxygen function at the 3-position, no protective group is required to prevent their reduction, and they can be directly converted to the corresponding 17α-alkynyl compounds (VI) by treatment with the sodium or potassium derivative of the appropriate alkyne; e.g., sodium acetylide on reaction with 7α-methyl-19-nor-5 (α or β)-androstan-17-one (V) yields 7α-methyl-19-nor-17β-hydroxy-17α-ethynyl-5 (α or β)-androstane (VI).

The alkynyl compounds of Formula VI can be readily reduced at the 17α-position selectively (e.g., with hydrogen in the presence of a palladium catalyst) to give the corresponding side-chain saturated compound (VI). For example, by employing the foregoing procedure, 7α-methyl-19-nor-17β-hydroxy-17α-ethynyl-5 (α or β)-androstane (VII) and 7α-methyl-19-nor-17β-hydroxy-17α-ethynyl-5 (α or β)-androstan-3-one (VII) are converted to 7α-methyl-19-nor-17β-hydroxy-17α-ethyl-5 (α or β)-androstane (VII) and 7α-methyl-19-nor-17β-hydroxy-17α-ethyl-5 (α or β)-androstan-3-one (VII), respectively.

The 17-ketones represented by Formula V can be converted to the corresponding 17β-hydroxy-17α-alkyl derivatives (VIII) by treatment with an appropriate alkylating agent such as an appropriate Grignard reagent or alkyl lithium compound. For example, 7α-methyl-19-nor-5 (α or β)-androstan-17-one (V) when heated under reflux in an inert solvent (e.g., benzene-tetrahydrofuran) with methylmagnesium bromide yields 7α,17α-dimethyl-19-nor-17β-hydroxy-5 (α or β)-androstane (VIII). Before converting the compounds of Formula V (Y=C=O) to the 17α-alkyl compounds (VIII) by the above procedure, it is necessary to first attach a protecting group at the 3-position, e.g., an enamine; this can be carried out in the manner described hereinbefore for preparing the 17α-alkynyl compounds (VI) from the corresponding 17-ketones (V). The 17α-alkylated-3-enamine produced by the reaction of an appropriate alkylating agent (e.g., a Grignard reagent or alkyl lithium) with a 3-enamine of a compound of Formula V is generally not isolated from the reaction mixture, but is hydrolyzed in situ to the corresponding 7α-methyl (or 2α,7α-dimethyl)-17α-alkyl derivative (VIII) by treatment with an aqueous solution of a base such as sodium hydroxide, potassium hydroxide, etc., after first decomposing the reaction mixture with water, ammonium chloride, and the like. By following the foregoing procedure, 2α,7α-dimethyl-5 (α or β)-androstane-3,17-dione 3-pyrrolidinyl enamine (V) is converted to 2α,7α,17α-trimethyl-17β-hydroxy-5 (α or β)-androstan-3-one (VIII).

The compounds of Formulae II through VIII of the present invention have anabolic and androgenic activity of improved therapeutic ratio of the former versus the latter. They also exhibit improved solubility properties in oil vehicles, e.g., sesame oil, cottonseed oil and like substances for intramuscular injection, thus permitting more effective doses of steroids to be administered in a practical volume of oil and prolonging the duration of biological effect. They also possess sedative, tranquilizing, central nervous system depressant, anti-fertility, anti-androgenic and anti-estrogenic activities. They also have the ability to reduce the level of cholesterol in the blood, inhibit platelet stickiness and decrease clot lysis time and consequently are of therapeutic value in the treatment or prevention of atherosclerosis and thromboembolic disorders. The foregoing properties make the new compounds useful in veterinary practice.

The compounds of Formulae II through VIII of the invention can be prepared and administered to mammals, birds, and animals, in a wide variety of oral or parenteral dosages forms, singly or in admixture with other coacting compounds. They can also be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

EXAMPLE 1

7α-methyl-17β-hydroxy-5β-androstan-3-one (II)

A solution of 1 g. of 7α-methyl-17β-hydroxy-4-androsten-3-one (7α-methyltestosterone) (I) (prepared as in J. Amer. Chem. Soc. 81, 4069) in 250 ml. of 95% ethyl alcohol is reacted with hydrogen using 5% palladium on charcoal catalyst until 1 mole equivalent of hydrogen is absorbed. The catalyst is removed by filtration through a bed of Celite (diatomaceous earth). The filtrate is concentrated to dryness, chromatographed and recrystallized from a mixture of acetone and Skellysolve B to give 7α-methyl-17β-hydroxy-5β-androstan-3-one (II).

Following the procedure of Example 1, but substituting for 7α-methyl-17β-hydroxy-4-androsten-3-one (I), the following representative starting materials:

(1) 7α-methyl-19-nor-17β-hydroxy-4-androsten-3-one (I) and
(2) 7α-methyl-19-nor-17β-hydroxy-4-androsten-3-one 17-acetate (I), yields respectively, (1) 7α-methyl-19-nor-17β-hydroxy-5β-androstan-3-one (II) and
(2) 7α-methyl-19-nor-17β-hydroxy-5β-androstan-3-one 17-acetate (II).

EXAMPLE 2

(a) 7α-methyl-5β-androstan-3,17-dione (V)
(b) 7α-methyl-3α-hydroxy-5β-androstan-17-one (V)
(c) 7α-methyl-3β-hydroxy-5β-androstan-17-one (V) and 7α-methyl-3α,17β-dihydroxy-5β-androstane (IIα)

(a) A solution of 1 g. of 7α-methyl-4-androstene-3,17-dione (prepared as in Example 46 of Belgian Patent 610,385) in 250 ml. of 95% ethyl alcohol is hydrogenated using 5% palladium on charcoal catalyst until 1 mole equivalent of hydrogen is absorbed. The catalyst is removed by filtration through a bed of Celite. The filtrate is concentrated to dryness, chromatographed and recrystallized from a mixture of acetone and Skellysolve B to give 7α-methyl-5β-androstane-3,17-dione (V).

Following the procedure of Example 2(a), but substituting 7α-methyl-19-nor-4-androstene-3,17-dione (prepared as in Example 29 of Belgian Patent 610,385) and 2α,7α-dimethyl-4-androstene-3,17-dione as starting materials, yields 7α-methyl-19-nor-5β-androstan-3,17-dione (V) and 2α,7α-dimethyl-5β-androstan-3,17-dione (V), respectively.

(b) To a solution of 1 g. of 7α-methyl-5β-androstane-3,17-dione (V) from (a), above, in 100 ml. of tetrahydrofuran, 1.5 g. of lithium aluminum tri-t-butoxyhydride at 0° C. is added with stirring. The reaction mixture is stored at about −15° C. for about 18 hours. Dilute acetic acid is added until the inorganic materials coagulate. The organic phase is decanted, dried over magnesium sulfate, filtered, concentrated to dryness, recrystallized and purified by chromatography employing a column of Florisil to yield pure 7α-methyl-3α-hydroxy-5β-androstan-17-one (V).

Following the procedure of Example 2(b), but substituting 7α-methyl-19-nor-5β-androstan-3,17-dione (V) and 2α,7α-dimethyl-5β-androstane-3,17-dione (V), prepared as in (a), above, as starting materials, yields 7α-methyl-19-nor-3α-hydroxy-5β-androstan-17-one (V) and 2α,7α-dimethyl-3α-hydroxy-5β-androstan-17-one (V).

(c) A solution of 1 g. of 7α-methyl-5β-androstane-3,17-dione (V) from (a), above, in 25 ml. of methanol is added to a solution of 45 mg. of sodium borohydride in 1 ml. of water and 5 ml. of methanol. After about 20 minutes, water and ether are added, the organic phase washed with water, dried and evaporated to dryness. The residual solid is separated into three components by chromatography on alumina and recrystallization to yield (1) 7α-methyl-3α-hydroxy-5β-androstan-17-one (V), (2) 7α-methyl-3β-hydroxy-5β-androstan-17-one (V) and a small amount of (3) 7α-methyl-3α,17β-dihydroxy-5β-androstane (IIα).

Following the procedure of Example 2(c), but substituting (1) 7α-methyl-19-nor-5β-androstan-3,17-dione (V) and (2) 2α,7α-dimethyl-5β-androstane-3,17-dione (V), prepared as in (a), above, as starting material, yields respectively, (1) 7α-methyl-19-nor-3α-hydroxy-5β-androstan-17-one (V), 7α-methyl-19-nor-3β-hydroxy-5β-androstan-17-one (V) and 7α-methyl-19-nor-3α,17β-dihydroxy-5β-androstane (IIα), and (2) 2α,7α-dimethyl-3α-hydroxy-5β-androstan-17-one (V), 2α,7α-dimethyl-3β-hydroxy-5β-androstan-17-one (V) and 2α,7α-dimethyl-3α,17β-dihydroxy-5β-androstane (IIα).

EXAMPLE 3

2α,7α-dimethyl-17β-hydroxy-5β-androstan-3-one (II)

(a) A solution of 9.96 g. (0.331 mole) of 7α-methyl-17β-hydroxy-4-androstene-3-one (7α-methyltestosterone) (I) in 150 ml. of t-butyl alcohol was treated with stirring at about 60° C. with 10 ml. of ethyl oxalate followed by 13 ml. of 25 percent sodium methoxide solution. Heating was stopped and stirring continued for about 20 minutes, while the temperature of the reaction mixture was allowed to decline without external cooling. After the addition of about 120 ml. of anhydrous ether and a further period of about 20 minutes of stirring, the yellow glyoxalate was collected by filtration, washed with ether and dried at about 70° C. in vacuo. The crude glyoxalate weighting 9.17 g. was mixed with 30 g. of potassium carbonate, 30 ml. of methyl iodide and 250 ml. of acetone; the mixture was stirred while heating under gentle reflux for a period of about 24 hours. The reflux condenser was removed and the reaction flask arranged for distillation. After between about 75 and 100 ml. had distilled, the reaction mixture was filtered and the filtrate evaporated to dryness to give 10 g. of solid. This material was dissolved in 125 ml. of methanol, purged with nitrogen and treated with 10 ml. of similarly purged 25 percent sodium methoxide solution. After about 2 hours at room temperature, 250 ml. of saturated salt solution was added, the mixture extracted with methylene chloride, dried and evaporated to an amber gum. This crude product was purified by chromatography on 350 g. of Florisil (synthetic magnesium silicate). Thirty-five fractions of 550 ml. volume were collected using a gradient from 100 percent Skellysolve B (hexane hydrocarbons) to 10 percent acetone–90 percent Skellysolve B. Fractions 18 to 28 contained 2.68 g. of crystals which after two recrystallizations from a mixture of acetone and Skellysolve B gave pure 2α,7α-dimethyl-17β-hydroxy-4-androstene-3-one (I), melting at 170 to 180° C.;

$\lambda_{max.}^{alc.}$ 214 mμ; ε=15,560; $\nu_{max.}^{Nujol}$ 3450, 1655, 1622, 1225, and 1075 cm.$^{-1}$.

*Analysis.*—Calcd. for $C_{21}H_{32}O_2$: C, 79.70; H, 10.19. Found: C, 79.59; H, 10.49.

Following the procedure of (a) of Example 3, but substituting for the starting steroid 7α-methyl-17β-hydroxy-4-androsten-3-one (I), the following representative starting materials:

(1) 7α-methyl-19-nor-17β-hydroxy-4-androsten-3-one (I) and
(2) 7α-methyl-19-nor-17β-hydroxy-4-androsten-3-one 17-acetate (I)

yields, respectively, (1) 2α,7α-dimethyl-19-nor-17β-hydroxy-4-androsten-3-one (I) and (2) 2α,7α-dimethyl-19-nor-17β-hydroxy-4-androsten-3-one 17-acetate (I).

(b) Following the procedure of Example 1, but substituting 2α,7α-dimethyl-17β-hydroxy-4-androstene-3 - one (I) and its corresponding 19-nor derivative (prepared as in the preceding two paragraphs) as starting materials, yields 2α,7α-dimethyl-17β-hydroxy-5β-androstan - 3 - one (II) and its 19-nor counterpart, respectively.

EXAMPLE 4

2α,7α,17α-trimethyl-17β-hydroxy-5β-androstan-3-one (II)

(a) To a solution of 50 g. of 7α,17α-dimethyl-17β-hydroxy-4-androsten-3-one (7α,17α - dimethyltestosterone) (I) (prepared as in J. Amer. Chem. Soc. 81, 4069) in 750 ml. of t-butyl alcohol, warmed to 55° C. in a nitrogen atmosphere, 50 ml. of ethyl oxalate and 65 ml. of 25 percent sodium methoxide solution was added with stirring. Stirring was continued for about 20 minutes after which 750 ml. of ether was added. The mixture was filtered and the solid of yellow glyoxalate dried in a vacuum oven to give 46 g. of crude material. A mixture of the crude glyoxalate, 150 g. of potassium carbonate, 150 ml. of methyl iodide and 1250 ml. of acetone was stirred and heated under reflux for about 24 hours. Approximately 500 ml. of liquid was distilled off and the remaining mixture filtered. The filter cake was washed with acetone and the combined mixture filtered. The cake was washed with additional acetone and the combined filtrate evaporated at reduced pressure to an amber gum which was dissolved in 625 ml. of methanol purged with nitrogen and treated with 50 ml. of 25 percent sodium methoxide solution. After about 2 hours, 1400 ml. of saturated sodium chloride solution was added, and the mixture extracted with methylene chloride. The extract was dried and the solvent evaporated. The crude gummy product was purified via chromatography on a 2.5 kg. column of Florisil. A mixture composed of 6 percent of acetone and the remainder Skellysolve B eluted 13.34 g. of crystals, which on recrystallization from acetone-Skellysolve B yielded 11.53 g. of the desired product melting at 158 to 159° C. A portion of the material was recrystallized from the same solvent pair to provide an analytical sample of pure 2α,7α,17α-trimethyl-17β-hydroxy-4-androsten-3-one (I) melting at 158 to 159° C.:

$\lambda_{max.}^{alc.}$ 242 m$\mu$; $\epsilon$=15.500; $\nu_{max.}^{Nujol}$ 3435, 1665, 1622, 1220, 1166, 1075 cm.$^{-1}$.

Depression of the melting point of the product (I [$R_2$=$CH_3$])

occurred on mixture with the starting material (I [$R_2$=H])

*Analysis.*—Calcd. for $C_{22}H_{34}O_2$: C, 79.95; H, 10.37. Found: C, 79.60; H, 10.48.

Following the procedure of (a) of Example 4, but substituting for the starting steroid 7α,17α-dimethyl-17β-hydroxy-4-androsten-3-one (I), the following representative starting materials:

(1) 7α,17α-dimethyl-19-nor-17β-hydroxy-4-androsten-3-one (I) and
(2) 7α,17α-dimethyl-19-nor-17β-hydroxy-4-androsten-3-one 17-acetate (I)

yields, respectively, (1) 2α,7α,17α-trimethyl-19-nor-17β-hydroxy-4-androsten-3-one (I) and
(2) 2α,7α,17α-trimethyl-19-nor-17β-hydroxy-4-androsten-3-one 17-acetate (I).

(b) Following the procedure of Example 1, but substituting 2α,7α,17α-trimethyl-17β-hydroxy-4 - androsten-4-one (I) and its corresponding 19-nor-derivative (prepared as in the preceding two paragraphs) as starting materials, yields 2α,7α,17α - trimethyl-17β-hydroxy-5β-androstan-3-one (II) and its 19-nor counterpart (II), respectively

EXAMPLE 5

7α-methyl-17β-hydroxy-5α-androstan-3-one (II)

To 2 l. of liquid ammonia was added 1.62 g. of lithium wire cut in small pieces. After the lithium had dissolved, 20 g. of 7α-methyl-17β-hydroxy-4-androsten-3-one (I) in 450 ml. of tetrahydrofuran (purified by passage through an aluminum oxide column) was added in a slow stream at reflux. The solution was refluxed for about 15 minutes, then 30 g. of solid ammonium chloride was added in small portions. The ammonia produced was rapidly evaporated on a steam bath. Water was added and the product extracted with ether. The ether extract was washed successively with water, dilute hydrochloric acid, water and brine, then dried over magnesium sulfate, filtered and concentrated to dryness. The amorphous solid was dissolved in methylene chloride and the solution poured onto a Florisil column. After chromatography and recrystallization from ethyl acetate, 10.5 g. of the product (II) was obtained that melted at 192 to 196° C. Recrystallization from acetone gave an analytical sample of 7α-methyl-17β-hydroxy-5α-androstan-3-one (II), melting at 195 to 196.5° C. with a rotation [α]$_D$ of +7° (chloroform).

*Analysis.*—Calcd. for $C_{20}H_{32}O_2$: C, 78.89; H, 10.60. Found: C, 78.22; H, 10.24.

Following the procedure of Example 5, but substituting 7α-methyl-19-nor-17β-hydroxy-4-androsten-3-one-(I) as starting material, yields 7α-methyl-19-nor-17β-hydroxy-5α-androstan-3- one (II).

EXAMPLE 6

7α-methyl-17β-hydroxy-5α-androstan-3-one 17-hydrocinamate (II)

To a solution of 3 g. of 7α-methyl-17β-hydroxy-5α-androstan-3-one (II) (from Example 5) in 25 ml. of methylene chloride and 3 ml. of pyridine, 1.85 g. of hydrocinnamoyl chloride was added. After standing for about 1.25 hours at room temperature, the solution was washed successively with water, dilute acid, dilute base, water, dried over magnesium sulfate and the solvent removed. The residue was chromatographed through Florisil and crystallized from acetone-Skellysolve B to give 2.55 g. of 7α-methyl-17β-hydroxy-5α-androstan-3-one-17hydrocinnamate (II) melting at 111 to 112° C. with a rotation [α]$_D$ of +14° (chloroform).

*Analysis.*—Calcd. for $C_{29}H_{40}O_3$: C, 79.77; H, 9.23. Found: C, 80.39; H, 9.76.

Following the procedure of Example 6, but substituting 7α - methyl-19-nor-17β-hydroxy-5α-androstan-3-one (II) as starting material, yields 7α-methyl-19-nor-17β-hydroxy-5α-androstan-3-one 17-hydrocinnamate (II).

In the same manner as in Example 6, the 17β-acetate, cyclopentylpropionate, formate, butyrate, isobutyrate, valerate, isovalerate, hexanoate, octanoate, phenylacetate and other like 17-esters of 7α-methyl-17β-hydroxy-5α-androstan-3-one (II) and their corresponding 19-nor counterparts are prepared by reaction of of their corresponding 17β-alcohols with the appropriate halide or acid anhydride.

EXAMPLE 7

7α,17α-dimethyl-17β-hydroxy-5α-androstan-3-one (II)

To about 1.2 l. of liquid ammonia, 0.8 g. of lithium wire cut in small pieces was added. After the lithium had dissolved, 10 g. of 7α,17α-dimethyl-17β-hydroxy-4-androsten-3-one (I) in 200 ml. of tetrahydrofuran (purified by passage through an aluminum oxide column) was added in a slow stream at reflux. The solution was refluxed for about 15 minutes, then 15 g. of solid ammonium chloride was added in small portions. The ammonia was rapidly evaporated on a steam bath. Water was added and the product extracted with ether. The ether extract was washed successively with water, dilute hydrochloric acid, water and brine, then dried over magnesium sulfate, filtered and concentrated to dryness. The amorphous solid was dissolved in methylene chloride and the solution poured onto a 250 g. Florisil column packed wet with Skellysolve B and eluted (employing 400 ml. fractions) by radient elution between 5 l. of a mixture comprising 2% acetone and 98% Skellysolve B and 5 l. of a mixture of 12% acetone and 88% Skellysolve B to give a residue which was crystallized from acetone-Skellysolve B to give 5.25 g. of material melting at 155 to 158° C. A second crop weighing 1.3 g. melting 150 to 153° C. was obtained by concentrating the mother liquor and recrystallizing the residue from aqueous methanol. Recrystallization of 200 mg. of the first crop material from acetone-Skellysolve B provided material for analysis of the desired product, 7α,17α-dimethyl-17β-hydroxy-5α-androstan - 3 - one (II), melting at 155 to 157° C., with rotation [α]$_D$-19° (chloroform); optical rotary dispersion data confirmed the 5α-hydrogen configuration; its nuclear magnetic resonance spectrum supported the proposed structure.

*Analysis.*—Calcd. for $C_{21}H_{34}O_2$: C, 79.19; H, 10.76. Found: C, 79.38; H, 11.36.

Following the procedure of Example 7, but substituting 7α,17α-dimethyl-19-nor-17β-hydroxy-4-androsten - 3 - one (I) as starting material, yields 7α,17α-dimethyl-19-nor-17β-hydroxy-5α-androstan-3-one (II).

EXAMPLE 8

(a) 2α,7α-dimethyl-17β-hydroxy-5α-androstan-3-one (II)

(b) 2α,7α-dimethyl-3β,17β-dihydroxy-5α-androstane (II′)

(a) To approximately 50 ml. of liquid ammonia cooled in a Dry Ice bath, 1 g. of lithium wire in small pieces was added with stirring. When solution was complete, the cooling bath was removed and a solution of 1 g. of 2α,7α-dimethyl-17β-hydroxy-4-androsten-3-one (I) in 20 ml. of tetrahydrofuran added. The mixture was stirred for 15 minutes, 15 g. of ammonium chloride added, and evaporation of the remaining ammonia was completed by heating on a warm-water bath. The residue was partitioned between water and methylene chloride. The organic phase was washed with cold dilute hydrochloric acid, water, dried and evaporated to a light amber gum. Purification was effected by chromatography on a 75 g. column of Florisil. Eighteen 200 ml. fractions were collected using a gradient of 3 to 7% acetone in Skellysolve B. Fractions 5 to 7 contained 336 mg. of partly crystalline product (II) which after two recrystallizations from acetone-Skellysolve B gave heavy needles of 2α,7α-dimethyl-17β-hydroxy-5α-androstan-3-one (II), melting at 167 to 171° C.

*Analysis.*—Calcd. for $C_{21}H_{34}O_2$: C, 79.19; H, 10.76 Found: C, 79.27; H, 11.30.

Following the procedure of Example 8(a), but substituting for 2α,7α-dimethyl-17β-hydroxy-4-androsten-3-one (I), the following representative starting materials:

(1) 2α,7α - dimethyl - 19-nor-17β-hydroxy-4-androsten-3-one (I) and (2) 2α,7α - dimethyl - 19-nor-17β-hidroxy-4-androsten-3-one 17-acetate (I)

yields, (1) 2α,7α-dimethyl-10-nor-5α-androstan-3-one (II).

(b) From fractions 8 to 15 a second crystalline substance was obtained lacking 3-carbonyl absorption in its infrared spectrum; after recrystallization from acetone-Skellysolve B, the product, 2α,7α-dimethyl-3β,17β-dihydroxy-5α-androstane (II′), melting at 168 to 169° C., was obtained.

*Analysis.*—Calcd. for $C_{21}H_{36}O_2$: C, 78.69; H, 11.32. Found: C, 78.67; H, 11.41.

On following the procedure of Example 8(b), but substituting 2α,7α - dimethyl-19-nor-17β-hydroxy-4-androsten-3-one (I) as starting material, the more polar fractions yield 2α,7α - dimethyl - 19-nor-3β,17β-dihydroxy-5α-androstane (II′).

EXAMPLE 9

2α,7α,17α-trimethyl-17β-hydroxy-5α-androstan-3-one (II)

To approximately 60 ml. of liquid ammonia cooled in a Dry-Ice bath, 1 g. of lithium wire was added with stirring. When solution was complete, the cooling bath was removed and a solution of 2 g. of 2α,7α,17α-trimethyl-17β-hydroxy-4-androsten-3-one (I) in 30 ml. of tetrahydrofuran was added. After stirring for about 15 minutes, 5 g. of ammonium chloride was added, and the ammonia evaporated on a warm-water bath. The residue was partitioned between water and methylene chloride, the organic phase separated, washed with cold dilute hydrochloric acid, water, dried and the solvent evaporated. The residue was chromatographed on a 100 g. column of Florisil. The eluate was collected in 200 ml. fractions using a gradient from 2 to 7% acetone in Skellysolve B. Fractions 5 to 13 contained 1.89 g. of crystals which showed no 3-ketone band in infrared absorption spectrum; this material was therefore oxidized by treatment with 1.6 g. of sodium dichromate in 16 ml. of acetic acid at room temperature for 2 hours. The product was isolated by dilution with water and chromatographed as before on a 75 g. column of Florisil. Crystals were obtained from the eluate which showed the presence of a 3-keto substituent. After recrystallization from acetone-Skellysolve B, the product obtained, 2α,7α,17α-trimethyl-17β-hydroxy-5α-androstan-3-one (II), melted at 143 to 144° C. with absorption $\nu_{max}^{Nujol}$ 3520, 1695, 1166, 1075 cm$^{-1}$.

*Analysis.*—Calcd. for $C_{22}H_{36}O_2$: C, 79,46; H, 10.91. Found: C, 79.16; H, 10.20.

From the more polar fractions 2α,7α,17α-trimethyl-3β, 17β-dihydroxy-5α-androstane is obtained.

Following the procedure of Example 9, but substituting 2α,7α,17α - trimethyl - 19 - nor-17β-hydroxy-4-androsten-3-one (I) as starting material, yields 2α,7α,17α-trimethyl-19-nor-17β-hydroxy-5α-androstane (II).

EXAMPLE 10

7α-methyl-3β,17β-dihydroxy-5α-androstane (II′)

To a solution of 2.5 g. of 7α-methyl-17β-hydroxy-5α-androstan-3-one (II) in 25 ml. of 95% alcohol, 0.6 g. of sodium borohydride was added. After stirring for about 1.25 hours, acetic acid was added to the reaction mixture until excess borohydride was destroyed. The crude product (II′) was precipitated with water, filtered, washed, dried and recrystallized from acetone-Skellysolve B to yield 1.85 g. of product (II′) melting at 212 to 212.5° C. Infrared assay indicated it to be an acetone solvate.

Several recrystallizations of the mother liquor residues from methanol gave 7α - methyl - 3β,17β - dihydroxy-5α-androstane (II′) solvated with methanol, having a melting point of 206 to 207° C. and a rotation [α]$_D$ of −14° (pyridine).

Recrystallization of the mother liquor residues from acetone gives 7α-methyl-3β,17β-dihydroxy-5α-androstane (II′) solvated with acetone.

Heating the methanol and acetone solvate of 7α-methyl-3β,17β-dihydroxy-5α-androstane (II′) in a vacuum oven at 80 to 100° C. gives the anhydrous compound, 7α-methyl-3β,17β-dihydroxy-5α-androstane (II′).

Following the procedure of Example 10, but substituting 2α,7α - dimethyl - 17β-hydroxy-5α-androstan-3-one (II), 7α - methyl-19-nor-17β-hydroxy-5α-androstan-3-one (II) and their corresponding 17-acylates (II) as starting materials, yields, respectively, 2α,7α - dimethyl - 3β,17β-dihydroxy-5α-androstane (II′), 7α-methyl-19-nor-3β,17β-dihydroxy-5α-androstane (II′) and their corresponding 17-acylates (II′).

EXAMPLE 11

7α,17α-dimethyl-3β,17β-dihydroxy-5α-androstane (II′)

To a solution of 1.1 g. of 7α,17α-dimethyl-17β-hydroxy-5α-androstan-3-one (II) in 23 ml. of methanol and 1 ml. of water, 150 mg. of sodium borohydride was added while cooling and stirring. After 1.5 hours a few drops of acetic acid was added to destroy the excess borohydride. The reaction mixture was diluted to about 50 ml. with water, the precipitate collection, washed with water and dried. The crude material was recrystallized from aqueous methanol to give 0.67 g. of crude product (II′) melting at 209 to 210° C. Another recrystallization gave an analytical sample of 7α,17α-dimethyl-3β,17β-dihydroxy-5α-androstane (II′) melting at 214 to 215° C. and having a rotation $[\alpha]_D$ of −39° (chloroform).

*Analysis.*—Calcd. for $C_{21}H_{36}O_2$: C, 78.69; H, 11.02. Found: C. 78.67; H, 10.92.

Following the procedure of Example 11, but substituting 2α,7α,17α - trimethyl-17β-hydroxy-5α-androstan-3-one (II), 2α,7α,17α - trimethyl - 19 - nor-17β-hydroxy-5α-androstan - 3 - one (II), 7α,17α - dimethyl - 19 - nor - 17β-hydroxy-5α-androstan-3-one (II) and the 17-acylates of the foregoing compounds (II) as starting materials, yields, respectively, 2α,7α,17α - trimethyl - 3β,17β-dihydroxy-5α-androstane (II′), 2α,7α,17α-trimethyl-19-nor-3β,17β-dihydroxy-5α-androstane (II′), 7α,17α-dimethyl-19-nor-3β-17β-dihydroxy-5α-androstane (II′) and their corresponding 17-acylates (II′).

EXAMPLE 12

(a) 7α - methyl - 3α,17β - dihydroxy - 5α - androstane 17-acetate (IIα) and 7α-methyl-3β,17β-dihydroxy-5α-androstane 17-acetate (IIβ)

(a) To a suspension of 3.5 g. of lithium aluminum tri-t-butoxyhydride in 50 ml. of tetrahydrofuran, 3.5 g. of 7α - methyl - 17β - hydroxy - 5α - androstan - 3 - one 17-acetate (II) was added with stirring at 0° C. The suspension was allowed to warm to room temperature during 30 minutes after which dilute hydrochloric acid was added dropwise until all of the excess hydride had been consumed. The solution was diluted further with 50 ml. of water and the tetrahydrofuran removed under reduced pressure. The product was extracted into ether and the combined extracts washed consecutively with water, saturated sodium chloride solution, dried with sodium sulfate and the solution evaporated to dryness under reduced pressure. Thin layer chromatography on silica gel G (ethyl acetate-cyclohexane 1:1) indicated the presence of both the 3α- and 3β-isomers of the product (II). This material was adsorbed onto 175 g. of Florisil in methylene chloride and the column eluted by twenty-five 250 ml. fractions of acetone-Skellysolve B over a gradient of from 0 to 15% acetone. Fractions 13 through 18 amounting to 1.52 g. were combined and recrystallized from Skellysolve B to give 1.3 g. of product (IIβ) melting at 143 to 144.5° C. A sample was recrystallized for analysis to give colorless needles of 7α-methyl-3β,17β-dihydroxy-5α-androstan 17 acetate (IIβ) melting at 144 to 145° C., infrared absorption ν max. 3485, 1725 and 1250 cm.$^{-1}$.

*Analysis.*—Calcd. for $C_{22}H_{36}O_3$: C, 75.81; H, 10.41. Found: C, 75.58; H, 10.24.

Further purification of the adjacent chromatograph fraction by chromatography on charcoal or a silica gel, counter current distribution and crystallization affords the 3α-hydroxy isomer.

Following the procedure of Example 12(a), but substituting for 7α-methyl-17β-hydroxy-5α-androstan-3-one 17-acetate (II) the following representative starting materials:

(1) 7α - methyl - 19 - nor - 17β - hydroxy - 5α - androstan-3-one 17-acetate (II),
(2) 2α,7α - dimethyl - 17β - hydroxy - 5α - androstan - 3-one 17-acetate (II),
(3) 2α,7α - dimethyl - 19 - nor - 17β - hydroxy - 5α - androstan-3-one 17-acetate (II)

yields, respectively, (1) 7α - methyl - 19 - nor - 3α,17β - dihydroxy - 5α - androstane 17-acetate (IIα) and 7α-methyl-19-nor-3β,17β-dihydroxy-5α-androstane 17-acetate (IIβ),
(2) 2α,7α - dimethyl - 3α,17β - dihydroxy - 5α - androstane 17-acetate (IIα) and 2α,7α-dimethyl-3β,17β-dihydroxy-5α-androstane 17-acetate (IIβ) and
(3) 2α,7α - dimethyl - 19 - nor - 3α,17β - dihydroxy - 5α-androstane 17-acetate (IIα) and 2α,7α-dimethyl-19-nor-3β,17β-dihydroxy-5α-androstane 17-acetate (IIβ).

(b) 7α - methyl - 3α,17β - dihydroxy - 5β - androstane 17-acetate (IIα) and 7α-methyl-3β,17β-dihydroxy-5β-androstane 17-acetate (IIβ)

(b) To a solution of 1 g. of 7α-methyl-17β-hydroxy-5β-androstan-3-one 17-acetate (II) [obtained by converting 7α-methyl-17β-hydroxy-5β-androstan-3-one (II), prepared as in Example 1, to its corresponding 17-acetate (in the manner described in the last paragraph of Example 6)] in 25 ml. of methanol, a solution of 125 mg. of sodium borohydride in 2 ml. of water and 10 ml. of methanol is added. The mixture warms spontaneously and after standing at room temperature for about 20 minutes, excess borohydride is destroyed by addition of a few drops of acetic acid. The reaction mixture is diluted to about 50 ml. with water, extracted with ether, the ether extracts washed with water, dried over magnesium sulfate and evaporated to dryness under reduced pressure. The crude solid is recrystallized from acetone-Skellysolve B; recrystallization from the same solvent pair yields pure 7α-methyl-3α,17β-dihydroxy-5β-androstane 17-acetate (IIα). Chromatography of the mother liquor over a Florisil column yields 7α-methyl-3β,17β-dihydroxy-5β-androstane 17-acetate (IIβ).

Following the procedure of Example 12(b), but substituting for 7α-methyl-17β-hydroxy-5β-androstan-3-one 17-acetate (II) the following representative starting materials:

(1) 7α - methyl - 19 - nor - 17β - hydroxy - 5β - androstan-3-one 17-acetate (II),
(2) 2α,7α - dimethyl - 17β - hydroxy - 5β - androstan - 3-one 17-acetate (II) and
(3) 2α,7α - dimethyl - 19 - nor - 17β - hydroxy - 5β - androstan-3-one 17-acetate (II)

yields, respectively, (1) 7α - methyl - 19 - nor - 3α,17β - dihydroxy - 5β - androstane 17-acetate (IIα) and 7α-methyl-19-nor-3β,17β-dihydroxy-5β-androstane 17-acetate (IIβ),
(2) 2α,7α - dimethyl - 3α,17β - dihydroxy - 5β - androstane 17-acetate (IIα) and 2α,7α-dimethyl-3β,17β-dihydroxy-5β-androstane 17-acetate (IIβ), and
(3) 2α,7α - dimethyl - 19 - nor - 3α,17β - dihydroxy - 5β-androstane 17-acetate (IIα) and 2α,7α-dimethyl-19-nor-3β,17β-dihydroxy-5β-androstane 17-acetate (IIβ).

(c) 7α-methyl-3α,17β-dihydroxy-5α-androstane (IIα)

100 mg. of 7α-methyl-3α,17β-dihydroxy-5α-androstane 17-acetate (IIα), obtained according to the procedure of Example 12(a), is dissolved in 4 ml. of 5% potassium hydroxide in methanol, followed by the addition of 4 drops of water. After standing for about 15 hours at room temperature the solution is warmed on a steam bath and diluted to incipient crystallization by the dropwise addition of water. On cooling, a colorless crystalline product (IIα) is isolated by filtration and air dried. Recrystallization of this material from alcohol and water gives pure 7α-methyl-3α,17β-dihydroxy-5α-androstane (IIα).

Following the procedure of Example 12(c), but substituting for 7α-methyl-3α,17β-dihydroxy-5α-androstane 17-acetate (IIα) the following representative starting materials:

(1) 7α - methyl - 19 - nor - 3β,17β - dihydroxy - 5α - androstane 17-acetate (IIβ),
(2) 7α - methyl - 3α,17β - dihydroxy - 5β - androstane 17-acetate (IIα),
(3) 2α,7α - dimethyl - 3α,17β - dihydroxy - 5α - androstane 17-acetate (IIα) and
(4) 2α,7α - dimethyl - 19 - nor - 3β,17β - dihydroxy - 5β-androstane 17-acetate (IIβ)

yields, respectively, (1) 7α - methyl - 19 - nor - 3β,17β - dihydroxy - 5α - androstane (IIβ),
(2) 7α - methyl - 3α,17β - dihydroxy - 5β - androstane (IIα),
(3) 2α,7α - dimethyl - 3α,17β - dihydroxy - 5α - androstane (IIα) and
(4) 2α,7α - dimethyl - 19 - nor - 3β,17β - dihydroxy - 5β-androstane (IIβ).

EXAMPLE 13

7α-methyl-3β,17β-dihydroxy-5α-androstane 17-acetate 3-p-toluenesulfonate (IIβ$_1$)

To 1.13 g. of 7α-methyl-3β,17β-dihydroxy-5α-androstane 17-acetate (IIβ) (obtained in Example 12) in 10 ml. of pyridine, 1.13 g. of p-toluenesulfonyl chloride was added and the reaction mixture allowed to stand for about 16 hours at room temperature. The solution was poured into 200 ml. of 3 N hydrochloric acid and refrigerated. The solid that separated was filtered, washed with water and dried. The solid was recrystallized from methanol at 4° C. to give 1.03 g. of product (IIβ$_1$) in two crops) melting at 90 to 91° C. A sample was recrystallized from methanol and gave 7α-methyl-3β,17β-dihydroxy-5α-androstane 17 - acetate 3 - p - toluenesulfonate (IIβ$_1$) with a melting point of 90 to 91° C., absorption $\nu_{max}$. 1731, 1602 and 1352 cm.$^{-1}$, which supported the expected structure of the desired compound (IIβ$_1$).

Analysis.—Calcd. for C$_{29}$H$_{42}$O$_5$S: C, 69.30; H, 8.43; S, 6.38. Found: C, 69.32; H, 8.40; S, 6.52.

Following the procedure of Example 13, but substituting 7α-methyl-19-nor-3β,17β - dihydroxy - 5α - androstane 17-acetate (IIβ), 2α,7α-dimethyl - 3β,17β - dihydroxy-5α - androstane 17-acetate (IIβ) and 2α,7α-dimethyl-19-nor-3β,17β-dihydroxy-5α-androstane 17-acetate (IIβ) as starting material, yields, respectively, 7α-methyl-19-nor-3β,17β-dihydroxy-5α-androstane 17-acetate 3-p-toluenesulfonate (IIβ$_1$), 2α,7α-dimethyl - 3β,17β - dihydroxy-5α-androstane 17-acetate 3-p-toluenesulfonate (IIβ$_1$), and 2α,7α - dimethyl-19-nor-3β,17β-dihydroxy-5α-androstane 17-acetate 3-p-toluenesulfonate (IIβ$_1$).

EXAMPLE 14

(a) 7α - methyl - 3β,17β - dihydroxy - 5α - androstane 3-p-toluenesulfonate (IIβ$_2$) and (b) 7α - methyl - 3β - hydroxy - 5α - androstan - 17 - one 3-p-toluenesulfonate (IIβ$_3$)

(a) A 940 mg. sample of 7α-methyl-3β,17β-dihydroxy-5α-androstane 17-acetate 3-p-toluenesulfonate (IIβ$_1$) (obtained in Example 13) was dissolved with warming in 50 ml. of methanol and treated with 1 ml. of concentrated hydrochloric acid. The solution was allowed to stand at room temperature for about 20 hours. It was then diluted with an equal volume of water and the alcohol removed under reduced pressure to give a semi-solid gum. The aqueous phase was decanted and the residue taken up in ether. The ether solution was washed consecutively with water, 4% sodium bicarbonate solution, saturated sodium chloride solution, dried over sodium sulfate and evaporated to dryness under reduced pressure. A sample of this material was crystallized from methanol to give 7α-methyl-3β,17β-dihydroxy-5α-androstane 3-p-toluenesulfonate (IIβ$_2$) melting at 95 to 100° C.

(b) The residue from (a), above, was taken up in 10 ml. of pyridine, 0.1 g. of chromic anhydride added and the mixture allowed to stand at room temperature for about 5 hours. The excess chromic acid was destroyed by the addition of 10 ml. of methanol and the solution concentrated to dryness under vacuum on a steam bath. The residue was taken up in ether and the ether solution washed consecutively with water, 4% sodium bicarbonate solution, saturated sodium chloride solution, dried over sodium sulfate and the solvent evaporated under reduced pressure. The residue, after azeotropic distillation of residual pyridine with toluene, was crystalline and was recrystallized from ethanol to give 510 mg. of product (IIβ$_3$) melting at 165.5 to 166.5° C. (with decomposition). A single recrystallization gave an analytical sample of 7α-methyl-3β-hydroxy-5α-androstan-17-one 3-p-toluenesulfonate (IIβ$_3$) melting at 168 to 169° C. (with decomposition) and having an infrared absorption $\nu_{max}$. at 1740, 1598 and 1495 cm.$^{-1}$.

Analysis.—Calcd. for C$_{27}$H$_{38}$O$_4$S: C, 70.55; H, 8.33; S, 6.98. Found: C, 70.33; H, 8.29; S, 7.01.

Following the procedure of Example 14, but substituting 7α - methyl - 3β,17β - dihydroxy-5α-androstane 17-acetate 3-p-toluenesulfonate (IIβ$_1$) the following starting materials:

(1) 7α - methyl - 19 - nor-3β,17β - dihydroxy-5α-androstane 17-3-p-toluenesulfonate (IIβ$_1$),
(2) 2α,7α - dimethyl - 3β,17β - dihydroxy - 5α - androstane 17-acetate 3-p-toluenesulfonate (IIβ$_1$) and
(3) 2α,7α - dimethyl - 19 - nor - 3β,17β - dihydroxy-5α-androstane 17-acetate 3-p-toluenesulfonate (IIβ$_1$)

yields, respectively, (1) 7α - methyl - 19 - nor - 3β,17β - dihydroxy-5α-androstane 3-p-toluenesulfonate (IIβ$_2$) and 7α - methyl - 19-nor - 3β-hydroxy-5α-androstan-17-one 3-p-toluenesulfonate (IIβ$_3$),
(2) 2α,7α-dimethyl-3β,17β-dihydroxy - 5α - androstane 3-p-toluenesulfonate (IIβ$_2$) and 2α,7α-dimethyl-3β-hydroxy-5α-androstan-17-one 3-p-toluenesulfonate (IIβ$_3$) and
(3) 2α,7α - dimethyl - 19 - nor - 3β,17β - dihydroxy-5α-androstane 3-p-toluenesulfonate (IIβ$_2$) and 2α,7α-dimethyl-19-nor-3β-hydroxy - 5α - androstan-17-one 3-toluenesulfonate (IIβ$_3$).

EXAMPLE 15

(a) 7α - methyl - 5α - androst-2-en-17-one (IIβ$_4$)

(b) 7α - methyl - 3α - hydroxy-5α-androstan-17-one 3-formate (IIβ$_5$) and (c) 7α - methyl - 3α - hydroxy -5α - androstan - 17 - one (IIβ$_6$)

A 410 mg. sample of 7α-methyl-3β-hydroxy-5α-androstan-17-one 3-p-toluenesulfonate (IIβ$_3$) (obtained in Example 14) was dissolved with warming in 20 ml. of dimethylformamide and the solution heated at between about 80 and 85° C. for about 3.5 days. The solution was poured into 250 ml. of saturated sodium chloride solution. The products were extracted with methylene chloride and the extracts washed consecutively with water, saturated sodium chloride solution, dried with sodium sulfate and evaporated under reduced pressure to give an oily residue containing 7α-methyl-5α-androstan-2-en-17-one (IIβ$_4$) and 7α-methyl-3α-hydroxy-5α-androstan-17-one 3-formate (IIβ$_5$).

The residue obtained above was dissolved in benzene, adsorbed onto a 10 g. column of Fisher A540 alumina and eluted over a gradient of from 0 to 5% methanol in benzene during 20 fractions of 10 ml. each. Fractions 2 and 3 were combined and recrystallized from Skellysolve B to give colorless prisms of 7α-methyl-5α-androst-2-en-17-one (IIβ$_4$), having a melting point of 138.6 to 140.1° C., $\nu_{max}$. 3020, 1737 and 1650 cm.$^{-1}$.

19

*Analysis.*—Calcd. for $C_{20}H_{30}O$: C, 83.86; H, 10.56. Found: C, 84.00; H, 10.35.

Fraction 7 contained 156 mg. of product ($II\beta_6$) and was recrystallized from a mixture of acetone and Skellysolve B to give 100 mg. of colorless plates melting at 162 to 165° C. A single recrystallization gave an analytical sample of 7α-methyl - 3α - hydroxy-5α-androstan-17-one ($II\beta_6$) with a melting point of 167 to 168° C. $\nu$max. 3470, 3415 and 1739 cm.$^{-1}$. Acetone is removed from the composition by heating at 120° C. under vacuum or by heating to its melting point.

*Analysis.*—Calcd. for $C_{20}H_{32}O \cdot 1/2CH_3COCH_3$: C, 77.54; H, 10.58. Found: C, 77.64; H, 10.51.

Following the procedure of Example 15, but substituting for 7α-methyl-3β-hydroxy - 5α - androstan-17-one 3-p-toluenesulfonate ($II\beta_3$) the following starting materials:

(1) 7α-methyl-19-nor-3β-hydroxy-5-androstan-17-one 3-p-toluenesulfonate ($II\beta_3$),
(2) 2α,7α-dimethyl-3β-hydroxy-5α-androstan-17-one 3-p-toluenesulfonate ($II\beta_3$) and
(3) 2α,7α-dimethyl-19-nor-3β-hydroxy-5α-androstan-17-one 3-p-toluenesulfonate ($II\beta_3$)

yields, respectively, (1) 7α-methyl-19-nor-5α-androst-2-en-17-one ($II\beta_4$), 7α-methyl-19-nor-3α-hydroxy-5α-androstane-17-one 3-formate ($II\beta_5$) and 7α-methyl-19-nor-3α-hydroxy-5α-androstan-17-one ($II\beta_6$),
(2) 2α,7α-dimethyl-5α-androst-2-en-17-one ($II\beta_4$), 2α,7α-dimethyl-3α-hydroxy-5α-androstan-17-one 3-formate ($II\beta_5$) and 2α,7α-dimethyl-3α-hydroxy-5α-androstan-17-one ($II\beta_6$) and
(3) 2α,7α-dimethyl-19-nor-5α-androst-2-en-17-one ($II\beta_4$), 2α,7α-dimethyl-19-nor-3α-hydroxy-5α-androstan-17-one 3-formate ($II\beta_6$) and 2α,7α-dimethyl-19-nor-3α-hydroxy-5α-androstan-17-one ($II\beta_6$).

EXAMPLE 16

7α-methyl-3α,17β-dihydroxy-5α-androstane 3-dihydropyranyl ether 17-acetate ($II\alpha_1$)

To 1.8 g. of 7α-methyl-3α,17β-dihydroxy - 5α - androstane 17-acetate ($II\alpha$) (obtained in accordance with the procedure of Example 12) suspended in 10 ml. of dihydropyran and 50 ml. of ether, 100 mg. of p-toluenesulfonic acid is added. The ether solution is stirred for about 16 hours, extracted successively with sodium bicarbonate solution, saturated sodium chloride solution, dried over anhydrous sodium sulfate and evaporated to dryness under reduced pressure to yield 7α-methyl-3α-dihydroxy-5α-androstane 3-dihydropyranyl ether 17-acetate ($II\alpha_1$). This residue is employed in the following example without further purification.

Similarly substituting a stoichiometrically equivalent amount of:

(1) 7α-methyl-19-nor-3α,17β-dihydroxy-5α-androstane 17-acetate ($II\alpha$),
(2) 2α,7α-dimethyl-3α,17β-dihydroxy-5α-androstane 17-acetate ($II\alpha$) and
(3) 2α,7α-dimethyl-19-nor-3α,17β-dihydroxy-5α-androstane 17-acetate ($II\alpha$)

yields, respectively, (1) 7-α-methyl-19-nor-3α,17β-dihydroxy-5α-androstane 3-dihydropyanyl ether 17-acetate ($II\alpha_1$),
(2) 2α,7α-dimethyl-3α,17β-dihydroxy-5α-androstane 3-dihydropyranyl ether 17-acetate ($II\alpha_1$) and
(3) 2α,7α-dimethyl-19-nor-3α,17β-dihydroxy-5α-androstane 3-dihydropyranyl ether 17-acetate ($II\alpha_1$).

20

EXAMPLE 17

7α-methyl-3α,17β-dihydroxy-5α-androstane 3-dihydropyranyl ether ($II\alpha_2$)

The residue comprising 7α-methyl-3α,17β - dihydroxy-5α-androstane 3-dihydropyranyl ether 17-acetate ($II\alpha_1$) (obtained in Example 16) is dissolved in 100 ml. of 5% potassium carbonate in methanol-water (4:1) solution and the reaction mixture heated to reflux for about 1.5 hours. The solvents are removed under reduced pressure to give a crystalline residue comprising 7α-methyl - 3α,17β - dihydroxy-5α-androstane 3-dihydropyranyl ether ($II\alpha_2$), which is used in the following experiment without further purification.

Similarly substituting for the residue comprising 7α-methyl - 3α,17β - dihydroxy-5α-androstane 3-dihydropyranyl ether ($II\alpha_1$) the residues comprising:

(1) 7α-methyl-19-nor-3α,17β-dihydroxy-5α-androstane 3-dihydropyranyl ether 17-acetate ($II\alpha_1$),
(2) 2,7α-dimethyl-3α,17β-dihydroxy-5α-androstane 3-dihydropyranyl ether 17-acetate ($II\alpha_1$) and
(3) 2α,7α-dimethyl-19-nor-3α,17β-dihydroxy-5α-androstane 3-dihydropyranyl ether 17-acetate ($II\alpha_1$)

yields, respectively, (1) 7α-methyl-19-nor-3α,17β-dihydroxy-5α-androstane 3-dihydropyranyl ether ($II\alpha_2$),
(2) 2,7α-dimethyl-3,17β-dihydroxy-5α-androstane 3-dihydropyranyl ether ($II\alpha_2$) and
(3) 2α,7α-dimethyl-19-nor-3α,17β-dihydroxy-5α-androstane 3-dihydropyranyl ether ($II\alpha_2$).

EXAMPLE 18

7α-methyl-3α-hydroxy-5α-androstan-17-one 3-dihydropyranyl ether ($II\alpha_3$)

The crystalline residue comprising 7α-methyl-3α,17β-dihydroxy-5α-androstane 3-dihydropyranyl ether ($II\alpha_2$) (obtained in Example 17) is taken up in 10 ml. of pyridine and added to pyridine-chromic acid complex prepared from 2 g. of chromic anhydride in 20 ml. of pyridine. The reaction mixture is stirred for about 5 hours at room temperature, diluted with a 1:1 mixture of ether and benzene and filtered on a Celite (diatomaceous earth) pad. The filtrate is washed successively with water and saturated sodium chloride solution, dried over anhydrous sodium sulfate and evaporated to dryness under reduced pressure and the residual pyridine distilled azeotropically with toluene under reduced pressure to yield a residue comprising 7α-methyl-3α-hydroxy - 5α - androstan - 17-one 3- dihydropyranyl ether ($II\alpha_3$) which was used without further purification in the following experiment.

Similarly substituting for the residues comprising 7α-methyl-3α,17β-dihydroxy - 5α - androstane - 3 - dihydropyranyl ether ($II\alpha_2$) the residues comprising:

(1) 7α-methyl-19-nor-3α,17β-dihydroxy-5α-androstane 3-dihydropyranyl ether ($II_2$),
(2) 2α,7α-dimethyl-3α,17β-dihydroxy-5α-androstane 3-dihydropyranyl ether ($II\alpha_2$) and
(3) 2α,7α-dimethyl-19-nor-3α,17β-dihydroxy-5α-androstane 3-dihydropyranyl ether ($II_2$)

yields, respectively, (1) 7α-methyl-19-nor-3α-hydroxy-5α-androstan-17-one 3-dihydropyranyl ether ($II\alpha_3$),
(2) 2α,7α-dimethyl-3α-hydroxy-5α-androstan-17-one 3-dihydropyranyl ether ($II\alpha_3$) and
(3) 2,7α-dimethyl-19-nor-3α-hydroxy-5α-androstan-17-one 3-dihydropyranyl ether ($II\alpha_3$).

EXAMPLE 19

7α-methyl-3α-hydroxy-5α-androstan-17-one ($II\alpha_4$)

The residue comprising 7α-methyl-3α-hydroxy-5α-androstan-17-one 3-dihydropyranyl ether ($II\alpha_3$) (obtained in Example 18) is taken up in 20 ml. of acetone and 2 ml. of 3 N hydrochloric acid added thereto. The reaction mixture, after standing at room temperature overnight, yields colorless crystals which on recrystallization from acetone-Skellysolve B gives 7α-methyl-3α-hydroxy-5α-androstan-17-one (IIα$_4$).

Following the procedure of Example 19, but substituting for the residue of 7α-methyl-3α-hydroxy-5α-androstan-17-one 3-dihydropyranyl ether (IIα$_3$) those comprising:

(1) 7α-methyl-19-nor-3α-hydroxy-5α-androstan-17-one 3-dihydropyranyl ether (IIα$_3$),
(2) 2α,7α-dimethyl-3α-hydroxy-5α-androstan-17-one 3-dihydropyranyl ether (IIα$_3$) and
(3) 2α,7α-dimethyl-19-nor-3α-hydroxy-5α-androstan-17-one 3-dihydropyranyl ether (IIα$_3$)

yields, respectively, (1) 7α-methyl-19-nor-3α-hydroxy-5α-androstan-17-one (IIα$_4$),
(2) 2α,7α-dimethyl-3α-hydroxy-5α-androstan-17-one (IIα$_4$) and
(3) 2α,7α-dimethyl-19-nor-3α-hydroxy-5α-androstan-17-one (IIα$_4$).

EXAMPLE 20

(a) 7α-methyl-5α-androstane-3,17-dione (V)

(b) 7α-methyl-3α-hydroxy-5α-androstan-17-one (V) and 7α-methyl-3β-hydroxy-5α-androstan-17-one (V)

(a) To a solution of 0.3 g. of 7α-methyl-17β-hydroxy-5α-androstan-3-one (II) (prepared as in Example 5) in 10 ml. of acetone, 0.275 ml. of Jones reagent (8 N chromium trioxide) was added with cooling. The crude product (V) was precipitated with water, filtered, dried and recrystallized from acetone-Skellysolve B to give 0.2 g. of 7α-methyl-5α-androstane-3,17-dione (V), melting at 158 to 159° C. and having a rotation [α]$_D$ of +79° (chloroform).

Analysis.—Calcd. for C$_{20}$H$_{30}$O$_2$: C, 79.42; H, 10.00. Found: C, 79.24; H, 10.01.

Following the procedure of Example 20, but substituting for 7α-methyl-17β-hydroxy-5α-androstan-3-one (II), the following representative starting materials:

(1) 7α-methyl-19-nor-17β-hydroxy-5α-androstan-3-one (II),
(2) 2α,7α-dimethyl-17β-hydroxy-5α-androstan-3-one (II) and
(3) 2α,7α-dimethyl-19-nor-17β-hydroxy-5α-androstan-3-one (II), yields, respectively, (1) 7α-methyl-19-nor-5α-androstane-3,17-dione (V),
(2) 2α,7α-dimethyl-5α-androstane3,17-dione (V) and
(3) 2α,7α-dimethyl-19-nor-5α-androstane-3,17-dione (V).

Following the procedure of Example 20, but substituting for 7α-methyl-17β-hydroxy-5α-androstan-3-one (II), the following representative starting materials:

(1) 7α-methyl-17β-hydroxy-5β-androstan-3-one (II) (prepared as in Example 1),
(2) 2α,7α-dimethyl-17β-hydroxy-5β-androstan-3-one (II) (prepared as in Example 3),
(3) 7α-methyl-19β-nor-17β-hydroxy-5β-androstan-3-one (II) and
(4) 2α,7α-dimethyl-19-nor-17β-hydroxy-5β-androstan-3-one (II)

yields, respectively, (1) 7α-methyl-5β-androstane-3,17-dione (V),
(2) 2α,7α-dimethyl-5β-androstane-3,17-dione (V),
(3) 7α-methyl-19-nor-5β-androstane3,17dione (V) and
(4) 2α,7α-dimethyl-19-nor-5β-androstane3,17-dione (V).

(b) A solution of 300 mg. of 7α-methyl-5α-androstane-3,17-dione (V), obtained in (a), above, in 5 ml. of pyridine is added to a solution of 15 mg. of sodium borohydride in 20 ml. of pyridine. The solution is allowed to stand at room temperature for about 2 hours and then diluted with water and extracted with ether. The ether extracts are washed with water, dried and evaporated to dryness in vacuo. The residue is chromatographed over a column of alumina and recrystallized to yield 7α-methyl-3α-hydroxy-5α-androstan-17-one (V) and 7α-methyl-3β-hydroxy-5α-androstan-17-one (V).

Following the procedure of Example 20(b), but substituting for 7α-methyl-5α-androstane-3,17-dione (V) the following representative starting materials:

(1) 7α-methyl-19-nor-5α-androstane-3,17-dione (V),
(2) 2α,7α-dimethyl-5α-androstane-3,17-dione (V) and
(3) 2α,7α-dimethyl-19-nor-5α-androstane-3,17-dione (V)

yields, respectively, (1) 7α-methyl-19-nor-3α-hydroxy-5α-androstan-17-one (V) and 7α-methyl-19-nor-3β-hydroxy-5α-androstan-17-one (V),
(2) 2α,7α-dimethyl-3α-hydroxy-5α-androstan-17-one (V) and 2α,7α-dimethyl-3β-hydroxy-5α-androstan-17-one (V), and
(3) 2α,7α-dimethyl-19-nor-3α-hydroxy-5α-androstan-17-one (V) and 2α,7α-dimethyl-19-nor-3β-hydroxy-5α-androstan-17-one (V).

EXAMPLE 21

7α-methyl-17β-hydroxy-5α-androstan-3-one 3-thioketal (III)

To a solution of 2 g. of 7α-methyl-17β-hydroxy-5α-androstan-3-one (II) (prepared as in Example 5) in 6 ml. of acetic acid cooled to about 10° C., 0.7 ml. of ethanedithiol and 0.7 ml. of borontrifluoride etherate is added. After standing at room temperature for about 20 minutes the reaction mixture is composed of crystalline material. It is diluted to a volume of about 25 ml. with water and ice. The crystals are collected, washed with water and dried to yield the crude product (III), which on recrystallization from a mixture of methanol and methylene chloride gives pure 7α-methyl-17β-hydroxy-5α-androstan-3-one 3-thioketal (III).

Following the procedure of Example 21 but substituting the following representative compounds for the starting material employed therein:

(1) 7α-methyl-19-nor-17β-hydroxy-5α-androstan-3-one (II),
(2) 7α,17α-dimethyl-17β-hydroxy-5α-androstan-3-one (II) (obtained in Example 7),
(3) 2α,7α-dimethyl-17β-hydroxy-5α-androstan-3-one (II) (obtained in Example 8),
(4) 2α,7α,17α-trimethyl-17β-hydroxy-5α-androstan-3-one (II) (obtained in Example 9),
(5) 7α,17α-dimethyl-19-nor-17β-hydroxy-5α-androstan-3-one (II),
(6) 2α,7α-dimethyl-19-nor-17β-hydroxy-5α-androstan-3-one (II),
(7) 2α,7α,17α-trimethyl-19-nor-17β-hydroxy-5α-androstan-3-one (II),
(8) 7α-methyl-19-nor-17β-hydroxy-5β-androstan-3-one (II),
(9) 7α,17α-dimethyl-17β-hydroxy-5β-androstan-3-one (II),
(10) 2α,7α-dimethyl-17β-hydroxy-5β-androstan-3-one (II),
(11) 2α,7α,17α-trimethyl-17β-hydroxy-5β-androstan-3-one (II),
(12) 7α,17α-dimethyl-19-nor-17β-hydroxy-5β-androstan-3-one (II),
(13) 2α,7α-dimethyl-19-nor-17β-hydroxy-5β-androstan-3-one (II) and

(14) 2α,7α,17α-trimethyl-19-nor-17β-hydroxy-5β-androstan-3-one (II)

yields, respectively, (1) 7α-methyl-19-nor-17β-hydroxy-5α-androstan-3-one 3-thioketal (III),
(2) 7α,17α-dimethyl-17β-hydroxy-5α-androstan-3-one 3-thioketal (III),
(3) 2α,7α-dimethyl-17β-hydroxy-5α-androstan-3-one 3-thioketal (III),
(4) 2α,7α,17α-trimethyl-17β-hydroxy-5α-androstan-3-one 3-thioketal (III),
(5) 7α,17α-dimethyl-19-nor-17β-hydroxy-5α-androstan-3-one 3-thioketal (III),
(6) 2α,7α - dimethyl-19-nor-17β-hydroxy-5α-androstan-one 3-thioketal (III),
(7) 2α,7α,17α trimethyl-19-nor-17β-hydroxy-5α-androstan-3-one 3-thioketal (III),
(8) 7α-methyl-19-nor-17β-hydroxy-5β-androstan-3-one 3-thioketal (III),
(9) 7α,17α-dimethyl-17β-hydroxy-5β-androstan-3-one 3-thioketal (III),
(10) 2α,7α-dimethyl-17β-hydroxy-5β-androstan-3-one 3-thioketal (III),
(11) 2α,7α,17α-trimethyl-17β-hydroxy-5β-androstan-3-one 3-thioketal (III),
(12) 7α,17α-dimethyl-19-nor-17β-hydroxy-5β-androstan-3-one 3-thioketal (III),
(13) 2α,7α-dimethyl-19-nor-17β-hydroxy-5β-androstan-3-one 3-thioketal (III) and
(14) 2α,7α-17α-trimethyl-19-nor-17β-hydroxy-5β-androstan-3-one 3-thioketal (III),

EXAMPLE 22

7α-methyl-17β-hydroxy-5α-androstane (IV)

To a solution of 1 g. of 7α-methyl-17β-hydroxy-5α-androstan-3-one 3-thioketal (III) (obtained in Example 21), 30 ml. of distilled liquid ammonia, 15 ml. of ether and 5 ml. of tetrahydrofuran, 1 g. of sodium metal is added in small pieces. The solution is refluxed for about 15 minutes and the blue color discharged by dropwise addition of absolute ethanol. A rapid stream of nitrogen is passed through the reaction vessel to evaporate the solvents. After removal of most of the ammonia and other solvents, water is added. The resulting precipitate is collected, washed with water, dried and recrystallized from Skellysolve B to yield 7α-methyl-17β-hydroxy-5α-androstane (IV).

Following the procedure of Example 22 but substituting the following representative compounds for the starting material employed therein:

(1) 7α-methyl-19-nor-17β-hydroxy-5α-androstan-3-one 3-thioketal (III),
(2) 7α,17α-dimethyl-17β-hydroxy-5α-androstan-3-one 3-thioketal (III),
(3) 2α,7α - dimethyl-17β-hydroxy-5α-androstan-3-one 3-thioketal (III),
(4) 2α,7α,17α-trimethyl-17β-hydroxy-5α-androstan-3-one 3-thioketal (III),
(5) 7α,17α - dimethyl-19-nor-17β-hydroxy-5α-androstan-3-one 3-thioketal (III),
(6) 2α,7α-dimethyl - 19 - nor-17β-hydroxy-5α-androstan-3-one-3-thioketal (III),
(7) 2α,7α,17α - trimethyl-19-nor-17β-hydroxy-5α-androstan-3-one 3-thioketal (III),
(8) 7α -methyl-19-nor-17β-hydroxy-5β-androstan-3-one 3-thioketal (III),
(9) 7α,17α - dimethyl-17β-hydroxy-5β-androstan-3-one 3-thioketal (III),
(10) 2α,7α - dimethyl-17β-hydroxy-5β-androstan-3-one 3-thioketal (III),
(11) 2α,7α,17α - trimethyl-17β-hydroxy-5β-androstan-3-one 3-thioketal (III),
(12) 7α,17α - dimethyl-19-nor-17β-hydroxy-5β-androstan 3-one 3-thioketal (III),
(13) 2α,7α - dimethyl-19-nor-17β-hydroxy-5β-androstan-3-one 3-thioketal (III) and
(14) 2α,7α,17α - trimethyl-19-nor-17β-hydroxy-5β-androstan-3-one 3-thioketal (III)

yields, respectively, (1) 7α-methyl-19-nor-17β-hydroxy-5α-androstane (IV),
(2) 7α,17α-dimethyl-17β-hydroxy-5α-androstane (IV),
(3) 2α,7α-dimethyl-17β-hydroxy-5α-androstane (IV),
(4) 2α,7α,17α-trimethyl - 17β - hydroxy-5α-androstane (IV),
(5) 7α,17α - dimethyl-19-nor-17β-hydroxy-5α-androstane (IV),
(6) 2α,7α - dimethyl-19-nor-17β-hydroxy-5α-androstane (IV),
(7) 2α,7α,17α - trimethyl-19-nor-17β-hydroxy-5α-androstane (IV),
(8) 7α-methyl-19-nor-17β-hydroxy-5β-androstane (IV),
(9) 7α,17α-dimethyl-17β-hydroxy-5β-androstane (IV),
(10) 2α,7α-dimethyl-17β-hydroxy-5β-androstane (IV),
(11) 2α,7α,17α - trimethyl-17β-hydroxy-5β-androstane (IV),
(12) 7α,17α - dimethyl - 19 - nor-17β-hydroxy-5β-androstane (IV),
(13) 2α,7α - dimethyl-19-nor-17β-hydroxy-5β-androstane (IV),
(14) 2α,7α,17α - trimethyl-19-nor-17β-hydroxy-5β-androstane (IV).

EXAMPLE 23

7α-methyl-19-nor-17β-hydroxy-4-androsten-3-one 3-thioketal (7α-methyl-19-nortestosterone 3-thioketal)

To a solution of 2 g. of 7α-methyl-19-nor-17β-hydroxy-4-androsten-3-one (I) in 6 ml. of acetic acid cooled to about 10° C., 0.7 ml. of ethanedithiol and 0.7 ml. of borontrifluoride etherate was added. After standing at room temperature for about 20 minutes the reaction mixture contained crystalline material. It was diluted to a volume of about 25 ml. with water and ice. The crystals were collected, washed with water and dried to yield 2.75 g. of product, which was recrystallized from a mixture of methanol and methylene chlorine to give 2.3 g. of 7α-methyl-19-nor-17β-hydroxy-4-androsten-3-one 3-thioketal having a melting point of 212 to 214° C., rotation $[\alpha]_D$ of +89° (chloroform) and an infrared absorption spectrum consistent with the expected structure of the compound.

*Analysis.*—Calcd. for $C_{21}H_{32}OS_2$: C, 69.17; H, 8.85; S, 17.59. Found: C, 69.89; H, 9.02; S, 17.23.

Following the procedure of Example 23 but substituting the following compounds for the starting material employed therein:

(1) 7α-methyl-17β-hydroxy-4-androsten-3-one (I),
(2) 2α,7α-dimethyl-17β-hydroxy-4-androsten-3-one (I),
(3) 2α,7α,17α - trimethyl - 17β - hydroxy-4-androsten-3-one (I),
(4) 2α,7α - dimethyl-19-nor-17β-hydroxy-4-androsten-3-one (I) and
(5) 7α,17α - dimethyl-19-nor-17β-hydroxy-4-androsten-3-one (I)

yields, respectively, (1) 7α-methyl-17-hydroxy-4-androsten-3-one 3-thioketal,
(2) 2α,7α - dimethyl-17β-hydroxy-4-androsten-3-one 3-thioketal,
(3) 2α,7α,17α - trimethyl-17β-hydroxy-4-androsten-3-one 3-thioketal,
(4) 2α,7α - dimethyl-19-nor-17β-hydroxy-4-androsten-3-one 3-thioketal and
(5) 7α,17α - dimethyl-19-nor-17β-hydroxy-4-androsten-3-one 3-thioketal.

EXAMPLE 24

7α-methyl-19-nor-17β-hydroxy-4-androstene (7α-methylestr-4-en-17β-ol)

To a solution of 1 g. of 7α-methyl-19-nor-17β-hydroxy-4-androsten-3-one 3-thioketal, 30 ml. of distilled liquid ammonia, 15 ml. of ether and 5 ml. of tetrahydrofuran, 1 g. of sodium metal was added in small pieces. The steroid went into solution rapidly as the sodium dissolved. The solution was refluxed for about 15 minutes and the blue color was discharged by dropwise addition of absolute ethanol. A fast stream of nitrogen was passed through to aid in evaporating the solvents. After nearly all of the ammonia and other solvents were removed, water was added. The resulting precipitate was collected, washed with water, dried and recrystallized from Skellysolve B to yield 0.6 g. of 7α-methyl-19-nor-17β-hydroxy-4-androstene having a melting point of 136 to 137° C. and rotation [α]$_D$ of +34° (chloroform).

Analysis.—Calcd. for $C_{19}H_{30}O$: C, 83.18; H, 11.02. Found: C, 82.97; H, 10.54.

Following the procedure of Example 24 but omitting tetrahydrofuran also yields 7α-methyl-19-nor-17β-hydroxy-4-androstene (IV).

Following the procedure of Example 24 but substituting the following compounds for the starting material employed therein:

(1) 7α-methyl-17β-hydroxy-4-androsten-3-one 3-thioketal,
(2) 2α,7α-dimethyl-17β-hydroxy-4-androsten-3-one 3-thioketal;
(3) 2α,7α,17α-trimethyl-17β-hydroxy-4-androsten-3-one 3-thioketal;
(4) 2α,7α-dimethyl-19-nor-17β-hydroxy-4-androsten-3-one 3-thioketal, and
(5) 7α,17α-dimethyl-19-nor-17β-hydroxy-4-androsten-3-one 3-thioketal yields, respectively, (1) 7α-methyl-17β-hydroxy-4-androstene,
(2) 2α,7α-dimethyl-17β-hydroxy-4-androstene,
(3) 2α,7α,17α-trimethyl-17β-hydroxy-4-androstene,
(4) 2α,7α-dimethyl-19-nor-17β-hydroxy-4-androstene, and
(5) 7α,17α-dimethyl-19-nor-17β-hydroxy-4-androstene.

EXAMPLE 25

7α-methyl-19-nor-17β-hydroxy-5β-androstane (IV)

A suspension containing 1 g. of 7α-methyl-19-nor-17β-hydroxy-4-androstene (obtained in Example 24) and 0.2 g. of 5% palladium-on-charcoal in 200 ml. of 95% alcohol is reacted with hydrogen until 1 mole equivalent of hydrogen is consumed. The catalyst is filtered off and the filtrate concentrated to dryness. The residue is purified by chromatography employing a column of Florisil to give 7α-methyl-19-nor-17β-hydroxy-5β-androstane (IV).

Following the procedure of Example 25 but substituting Adams (platinium dioxide) catalyst for 5% palladium-on-charcoal also yields 7α-methyl-19-nor-17β-hydroxy-5β-androstane (IV).

Following the procedure of Example 25 but substituting the following representative compounds for the starting material employed therein:

(1) 7α-methyl-17β-hydroxy-4-androstene,
(2) 2α,7α-dimethyl-17β--hydroxy-4-androstene,
(3) 2α,7α,17α-trimethyl-17β-hydroxy-4-androstene,
(4) 2α,7α-dimethyl-19-nor-17β-hydroxy-4-androstene and
(5) 2α,7α,17α-trimethyl-19-nor-17β-hydroxy-4-androstene yields, respectively, (1) 7α-methyl-17β-hydroxy-5β-androstane (IV),
(2) 2α,7α-dimethyl-17β-hydroxy-5β-androstane (IV),
(3) 2α,7α,17α-trimethyl-17β-hydroxy-5β-androstane (IV),
(4) 2α,7α-dimethyl-19-nor-17β-hydroxy-5β-androstane (IV), and
(5) 2α,7α,17α-trimethyl-19-nor-17β-hydroxy-5β-androstane (IV).

EXAMPLE 26

7α-methyl-19-nor-17β-hydroxy-5β-androstan 17-acetate (IV)

A solution of 0.7 g. of 7α-methyl-19-nor-17β-hydroxy-5β-androstane (IV) (obtained in Example 25) in 1.4 ml. of pyridine and 0.7 ml. of acetic anhydride is kept at room temperature for about 16 hours. Water is slowly added to the reaction mixture and the product extracted with methylene chloride, washed with aqueous sodium chloride until nearly neutral, dried and the solvent removed. The oil residue is chromatographed through a column of Florisil giving 7α-methyl-19-nor-17β-hydroxy-5β-androstane 17-acetate (IV).

Similarly, by reacting 7α-methyl-19-nor-17β-hydroxy-5β-androstane (IV) with the appropriate hydrocarbon carboxylic acid anhydride, for example, at temperatures between about 30° and 150° C. using the above procedure there are produced other 17-acylates thereof such as 17-propionate, 17-butyrate, 17-valerate, 17-hexanoate, 17-trimethylacetate, 17-isobutyrate, 17-isovalerate, 17-cyclohexanecarboxylate, 17 - cyclopentylpropionate, 17-phenylpropionate, 17-p-hexyloxypropionate, 17-benzoate, 17-hemisuccinate, 17-phenylacetate, 17-acrylate, 17-crotonate, 17-undecylenate, 17-propiolate, 17-cinnamate, 17-maleate and 17-citraconate.

Following the procedure of Example 26 and the paragraph directly hereinabove, but substituting as starting materials other 3-desoxy-7α-methyl-17β-hydroxy steroids (IV) such as 7α-methyl-17β-hydroxy-5β-androstane (IV), 2α 7α-dimethyl-17β-hydroxy-5β-androstane (IV), 2α,7α, 17α-trimethyl-17β-hydroxy-5β-androstane (IV), 2α,7α-dimethyl-19-nor-17β-hydroxy-5β-androstane (IV) and 2α, 7α,17α-trimethyl-19-nor-17β-hydroxy-5β-androstane (IV), yields the corresponding 17-acylates thereof.

EXAMPLE 27

7α-methyl-19-nor-5β-androstan-17-one (V)

To a solution of 3 g. of 7α-methyl-19-nor-17β-hydroxy-5β-androstane (IV) (obtained in Example 25) in 35 ml. of acetone cooled in an ice-bath, 3 ml. of 8 N chromium trioxide reagent (Jones reagent) is added dropwise with stirring. After about 10 minutes the mixture is diluted to a volume of about 150 ml. with water. The precipitate is collected, washed with water and dried to yield the desired product (V). Recrystallization from acetone-Skellysolve B gives pure 7α-methyl-19-nor-5β-androstane-17-one (V).

Following the procedure of Example 27 but substituting the following representative compounds for the starting materials employed therein:

(1) 7α-methyl-17β-hydroxy-5β-androstane (IV),
(2) 2α,7α-dimethyl-17β-hydroxy-5β-androstane (IV),
(3) 2α,7α-dimethyl-19-nor-17β-hydroxy-5β-androstane (IV),
(4) 7α-methyl-17β-hydroxy-5β-androstan-3-one (II),
(5) 7α-methyl-19-nor-17β-hydroxy-5β-androstan-3-one (II),
(6) 2α,7α-dimethyl-17β-hydroxy-5β-androstan-3-one (II),
(7) 2α,7α-dimethyl-19-nor-17β-hydroxy-5β-androstan-3-one (II)

yields, respectively, (1) 7α-methyl-5β-androstan-17-one (V),
(2) 2α,7α-dimethyl-5β-androstan 17-one (V),
(3) 2α,7α-dimethyl-19-nor-5β-androstan-17-one (V),
(4) 7α-methyl-5β-androstane-3,17-dione (V),
(5) 7α-methyl-19-nor-5β-androstane-3,17-dione (V),
(6) 2α,7α-dimethyl-5β-androstane-3,17-dione (V) and
(7) 2α,7α-dimethyl-19-nor-5β-androstane-3,17-dione (V).

EXAMPLE 28

7α-methyl-19-nor-17β-hydroxy-17α-ethynyl-5β-antrostane (VI)

A suspension of sodium acetylide (20% in xylene) is centrifuged and the sludge slurried with 10 ml. of dimethylsulfoxide. A mixture of 2 g. of 7α-methyl-19-nor-5β-androstan-17-one (V) (obtained in Example 27) in 10 ml. of dimethylsulfoxide is mixed with the sodium acetylide. After keeping the mixture at room temperature for about a half hour it is stored in the refrigerator for about 16 hours. Water is added to the frozen mixture and the product extracted with ether. The extracts are washed with dilute acid, sodium bicarbonate and water, and the solvent removed to give an oily residue. The residue is chromatographed through neutral alumina; recrystallization of the crude product gives pure 7α-methyl-19-nor-17β-hydroxy-17α-ethynyl-5β-androstane (VI).

Following the procedure of Example 28 but substituting the following compounds for the starting material employed therein:

(1) 7α-methyl-5β-androstan-17-one (V),
(2) 2α,7α-dimethyl-5β-androstan-17-one (V) and
(3) 2α,7α-dimethyl-19-nor-5β-androstan-17-one (V)

yields, respectively, (1) 7α-methyl-17β-hydroxy-17α-ethynyl-5β-androstane (VI),
(2) 2α,7α-dimethyl-17β-hydroxy-17α-ethynyl-5β-androstane (VI) and
(3) 2α,7α-dimethyl-19-nor-17β-hydroxy-17α-ethynyl-5β-androstane (VI).

Following the procedure of Example 28 but substituting the following reagents for sodium acetylide:

(a) soduim methylacetylide,
(b) sodium chloroacetylide,
(c) sodium bromoacetylide and
(d) sodium trifluoromethylacetylide yields, respectively, (a) 7α-methyl-19-nor-17β-hydroxy-17α(1-propynyl)-5β-androstane (VI),
(b) 7α-methyl-19-nor-17β-hydroxy-17α-chloroethynyl-5β-androstane (VI),
(c) 7α-methyl-19-nor-17β-hydroxy-17α-bromoethynyl-5β-androstane (VI) and
(d) 7α-methyl-19-nor-17β-hydroxy-17α-trifluoromethylethynyl-5β-androstane (VI).

Following the procedures of Example 28 and the two hereinabove paragraphs yields:

(1) 7α-methyl-17β-hydroxy-17α(1-propynyl)-5β-androstane (VI),
(2) 7α-methyl-17β-hydroxy-17α-chloroethynyl-5β-androstane (VI),
(3) 7α-methyl-17β-hydroxy-17α-bromoethynyl-5β-androstane (VI),
(4) 7α-methyl-17β-hydroxy-17α-trifluoromethylethynyl-5β-androstane (VI),
(5) 2α,7α-dimethyl-17β-hydroxy-17α(1-propynyl)-5β-androstane (VI),
(6) 2α,7α-dimethyl-17β-hydroxy-17α-chloroethynyl-5β-androstane (VI),
(7) 2α,7α-dimthyl-17β-hydroxy-17α-bromoethynyl-5β-androstane (VI),
(8) 2α,7α-dimethyl-17β-hydroxy-17α-trifluoromethylethynyl-5β-androstane (VI),
(9) 2α,7α-dimethyl-19-nor-17β-hydroxy-17α(1-propynyl)-5β-androstane (VI),
(10) 2α,7α-dimethyl-19-nor-17β-hydroxy-17α-chloroethynyl-5β-androstane (VI),
(11) 2α,7α-dimethyl-19-nor-17β-hydroxy-17α-bromoethynyl-5β-androstane (VI) and
(12) 2α,7α-dimethyl-19-nor-17β-hydroxy-17α-trifluoromethylethynyl-5β-androstane (VI).

Following the procedures of Example 28 and the subsequent two paragraphs, but substituting the respective 3-enamine, 3-ketal, or 3-enol ether of the following starting materials (prepared from the corresponding 3-ketosteroid, e.g., in the manner disclosed in J. Amer. Chem. Soc. 78, 430, ibid. 80, 4717 and ibid. 75, 650, respectively):

(1) 7α-methyl-5β-androstane-3,17-dione (V),
(2) 7α-methyl-19-nor-15β-androstane-3,17-dione (V),
(3) 2α,7α-dimethyl-5β-androstane-3,17-dione (V) and
(4) 2α,7α-dimethyl-19-nor-5β-androstane-3,17-dione ethynyl)-5β-andorstan-3-one (VI), following by cleavage of the aforesaid protecting group at the 3-position to restore the 3-keto function (in the manner described in the above-cited publications) yields, respectively, (1)(a) 7α-methyl-17β-hydroxy-17α-ethynyl-5β-androstan-3-one (VI),
(1)(b) 7α-methyl-17β-hydroxy-17α(1-propynyl)-5β-androstan-3-one (VI),
(1)(c) 7α-methyl-17β-hydroxy-17α-chloroethynyl-5β-androstan-3-one (VI),
(1)(d) 7α-methyl-17β-hydroxy-17α-bromoethynyl-5β-androstan-3-one (VI),
(1)(e) 7α-methyl-17β-hydroxy-17α-trifluoromethylethynyl-5β-androstan-3-one (VI),
(2)(a) 7α-methyl-19-nor-17β-hydroxy-17α-ethynyl-5β-androstan-3-one (VI),
(2)(b) 7α-methyl-19-nor-17β-hydroxy-17α(1-propynyl)-5β-androstan-3-one (VI),
(2)(c) 7α-methyl-19-nor-17β-hydroxy-17α-chloroethynyl-5β-androstan-3-one (VI),
(2)(d) 7α-methyl-19-nor-17β-hydroxy-17α-bromoethynyl-5β-androstan-3-one (VI),
(2)(e) 7α-methyl-19-nor-17β-hydroxy-17α-trifluoromethylethynyl-5β-androstan-3-one (VI),
(3)(a) 2α,7α-dimethyl-17β-hydroxy-17α-ethynyl-5β-androstan-3-one (VI),
(3)(b) 2α,7α-dimethyl-17β-hydroxy-17α(1-propynyl)-5β-androstan-3-one (VI),
(3) (c) 2α,7α-dimethyl-17β-hydroxy-17α-chloroethynyl-5β-androstan-3-one (VI),
(3) (d) 2α,7α-dimethyl-17β-hydroxy-17α-bromoethynyl-5b-androstan-3-one (VI),
(3) (e) 2α,7α-dimethyl-17β-hydroxy-17α-trifluoromethylethynyl-5β-androstan-3-one (VI),
(4) (a) 2α,7α-dimethyl-19-nor-17β-hydroxy-17α-ethynyl-5β-androstan-3-one (VI),
(4) (b) 2α,7α-dimethyl-19-nor-17β-hydroxy-17α(1-propynyl)-5β-androstan-3-one (VI),
(4) (c) 2α,7α-dimethyl-19-nor-17β-hydroxy-17α-chloroethynyl-5β-androstan-3-one (VI),
(4) (d) 2α,7α-dimethyl-19-nor-17β-hydroxy-17α-bromoethynyl-5β-androstan-3-one (VI) and
(4) (e) 2α,7α-dimethyl-19-nor-17β-hydroxy-17α-trifluoromethylethynyl-5β-androstan-3-one (VI).

Following the procedures of Example 28 and the paragraphs thereafter, and substituting the following starting materials and reagents:

(1) 3β-hydroxy-7α-methyl-19-nor-5β-androstane-17-one (V) and sodium acetylide,
(2) 3α-hydroxy-7α-methyl-19-nor-5β-androstane-17-one (V) and sodium acetylide,
(3) 7α-methyl-5β-androstane-3β-hydroxy-17-one (V) (obtained in Example 2) and sodium methylacetylide,
(4) 3α-hydroxy-7α-methyl-5β-androstane-17-one (V) and sodium methylacetylide,
(5) 3β-hydroxy-2α,7α-dimethyl-5β-androstane-17-one (V) and sodium chloroacetylide,
(6) 3α-hydroxy-2α,7α-dimethyl-5β-androstane-17-one (V) and sodium chloroacetylide,
(7) 3β-hydroxy-2α,7α-dimethyl-19-nor-5β-androstane-17-one (V) and sodium trifluoromethylacetylide, (8) 3α-hydroxy-2α,7α-dimethyl-19-nor-5β-androstane-17-one (V) and sodium trifluoromethylacetylide yields, respectively, (1) 7α-methyl-19-nor-3β,17β-dihydroxy-17α-ethynyl-5β-androstane (VI),
(2) 7α-methyl-19-nor-3α,17β-dihydroxy-17α-ethynyl-5β-androstane (VI),
(3) 7α-methyl-3β,17β-dihydroxy-17α(1-propynyl)-5β-androstane (VI),
(4) 7α-methyl-3α,17β-dihydroxy-17α(1-propynyl)-5β-androstane (VI),
(5) 2α,7α-dimethyl-3β,17β-dihydroxy-17α-chloroethynyl-5β-androstane (VI),
(6) 2α,7α-dimethyl-3α,17β-dihydroxy-17α-chloroethynyl-5β-androstane (VI),
(7) 2α,7α-dimethy-19-nor-3β,17β-dihydroxy-17α-trifluoromethylethynyl-5β-androstane (VI) and
(8) 2α,7α-dimethyl-19-nor-3α,17β-dihydroxy-17α-trifluoromethylethynyl-5β-androstane (VI).

Following the procedure of Example 28 and the paragraphs thereafter, but substituting the corresponding 5α-androstane starting materials (V) for the 5β-androstanes (V) employed therein, yields the corresponding 17α-alkynyl and haloalkynyl-5α-androstanes (VI).

EXAMPLE 29

7α-methyl-19-nor-3β,17β-dihydroxy-17α-ethynyl-5β-androstane 3-propionate (VI)

A solution of 100 mg. of 7α-methyl-19-nor-3β,17β-dihydroxy-17α-ethynyl-5β-androstane (VI) (prepared as described in Example 28) in 0.4 ml. of pyridine and 0.35 ml. of propionic anhydride is kept at room temperature for a period of about 16 hours. Ice and water are added and the product extracted with ether and washed successively with water, dilute hydrochloric acid, water, dilute sodium hydroxide, water and then dried. The solvent is removed and the residue recrystallized from Skellysolve B to give 7α-methyl-19-nor-3β,17β-dihydroxy-17α-ethynyl-5β-androstane 3-propionate (VI).

Similarly, by reacting 7α-methyl-19-nor-3β,17β-dihydroxy-17α-ethynyl-5β-androstane (VI) and 7α-methyl-19-nor-3α,17β-dihydroxy-17α-ethynyl-5β-androstane (VI) with the appropriate hydrocarbon carboxylic acid anhydride using the above procedure, there are produced other 3-acylates thereof such as the 3-butyrate, 3-valerate, 3-hexanoate, 3-trimethylacetate, 3-isobutyrate, 3-isovalerate, 3-cyclohexanecarboxylate, 3-cyclopentylpropionate, 3-p-hexyloxypropionate, phenylpropionate, 3-benzoate, 3-hemisuccinate, 3-phenylacetate, 3-acrylate, 3-crotonate, 3-undecylanate, 3-propiolate, 3-cinnamate, 3-maleate and 3-citraconate.

Following the procedure of Example 29 and the paragraph directly above, but substituting as starting materials other 3(α and β)-hydroxy-17α-ethynyl steroids (VI) such as 2α,7α-dimethyl-19-nor-3β,17β-dihydroxy-17α-ethynyl-5β-androstane (VI), 2α,7α-dimethyl-3β,17β-dihydroxy-17α-ethynyl-5β-androstane (VI), 2α,7α-dimethyl-19-nor-3β,17β-dihydroxy-17α-chloroethynyl-5β-androstane (VI), 2α,7α-dimethyl-19-nor-3α,17β-dihydroxy-17α-ethynyl-5β-androstane (VI), 2α,7α-dimethyl-3α,17β-dihydroxy-17α-ethynyl-5β-androstane (VI), and 2α,7α-dimethyl-3α,17β-dihydroxy-17α-chloroethynyl-5β-androstane (VI), yields the corresponding 3-acylates thereof.

EXAMPLE 30

(a) 7α-methyl-19-nor-17β-hydroxy-17α-ethyl-5β-androstane (VII)

A catalyst comprising a suspension of 100 mg. of 1% palladium-on-charcoal in 30 ml. of dioxane (purified by passage through a column of neutral alumina) is reduced at atmospheric pressure with hydrogen. A solution of 0.4 g. of 7α-methyl-19-nor-17β-hydroxy-17α-ethynyl-5β-androstane (VI) (from Example 28) in 5 ml. of dioxane is injected into the reaction flask through a rubber stopper. Hydrogenation is continued until 2 moles of hydrogen (66.5 mls.) are consumed at atmospheric pressure. The catalyst is removed by filtration and the filtrate concentrated to dryness on a rotary evaporator. The oily residue is chromatographed through a column of 125 g. of Florisil. The eluted material is recrystallized from aqueous methanol. Recrystallization from the same solvent gives crystal of 7α-methyl-19-nor-17β-hydroxy-17α-ethyl-5β-androstane (VII).

(b) 7α-methyl-19-nor-17β-hydroxy-17α-ethenyl-5β-androstane (VII')

Following the procedure of Example 30(a), above, but permitting hydrogenation to proceed until only 1 mole (33.25 mls.) of hydrogen is consumed instead of 2 moles, yields 7α-methyl-19-nor-17β-hydroxy-17α-ethynyl-5β-androstane (VII').

Following the procedure of Example 30(a) but substituting the following compounds for the starting material employed therein:

(1) 7α-methyl-17β-hydroxy-17α-ethynyl-5β-androstane (VI),
(2) 2α,7α-dimethyl-17β-hydroxy-17α-ethynyl-5β-androstane (VI),
(3) 2α,7α-dimethyl-19-nor-17β-hydroxy-17α-ethynyl-5β-androstane (VI),
(4) 7α-methyl 17β-hydroxy-17α-ethynyl-5β-androstan-3-one (VI),
(5) 7α-methyl-19-nor-17β-hydroxy-17α-ethynyl-5β-androstan-3-one (VI),
(6) 2α,7α-dimethyl-17β-hydroxy-17α-ethynyl-5β-androstan-3-one (VI),
(7) 2α,7α-dimethyl-19-nor-17β-hydroxy-17α-ethynyl-5β-androstan-3-one (VI), yields the corresponding 17α-ethyl counterparts of (1), (2), (3), (4), (5), (6) and (7) of Formula VII.

Following the procedure of Example 30(a) but substituting the following compounds for the starting material employed therein:

(1) 7α-methyl-19-nor-17β-hydroxy-17α(1-propynyl)-5β-androstane (VI),
(2) 7α-methyl-19-nor-17β-hydroxy-17α-trifluoromethylethynyl-5β-androstane (VI),
(3) 2α,7α-dimethyl-17β-hydroxy-17α(1-propynyl)-5β-androstane (VI),
(4) 2α,7αdimethyl-17β-hydroxy-17α-trifluoromethyl-5β-androstane (VI),
(5) 2α,7α-dimethyl-19-nor-17β-hydroxy-17α(1-propynyl)-5β-androstane (VI),
(6) 2α,7α-dimethyl-19-nor-17β-hydroxy-17α-trifluoromethylethynyl-5β-androstane (VI),
(7) 7α-methyl-17β-hydroxy-17α(1-propynyl)-5β-androstan-3-one (VI),
(8) 7α-methyl-17β-hydroxy-17α-trifloromethylethynyl-5β-androstan-3-one (VI),
(9) 7α-methyl-19-nor-17β-hydroxy-17α(1-propynyl)-5β-androstan-3-one (VI),
(10) 7α-methyl-19-nor-17β-hydroxy-17α-trifluoromethylethynyl-5β-androstan-3-one (VI),
(11) 2α,7α-dimethyl-17β-hydroxy-17α(1-propynyl)-5β-androstan-3-one (VI),
(12) 2α,7α-dimethyl-17β-hydroxy-17α-trifluoromethylethynyl-5β-androstan-3-one (VI),
(13) 2α,7α-dimethyl-19-nor-17β-hydroxy-17α(1-propynyl)-5β-androstan-3-one (VI) and
(14) 2α,7α-dimethyl-19-nor-17β-hydroxy-17α-trifluoromethylethynyl-5β-androstan-3-one (VI)

yields, respectively, (1) 7α-methyl-19-nor-17β-hydroxy-17α-propyl-5β-androstane (VII),
(2) 7α-methyl-19-nor-17β-hydroxy-17α-(3,3,3-trifluoropropyl)-5β-androstane (VII), (3) 2α,7α-dimethyl-17β-hydroxy-17α-propyl-5β-androstane (VII),
(4) 2α,7α-dimethyl-17β-hydrovy-17α-(3,3,3-trifluoropropyl)-5β-androstane (VII),
(5) 2α,7α-dimethyl-19-nor-17β-hydroxy-17α-propyl-5β-androstane (VII),
(6) 2α,7α-dimethyl-19-nor-17β-hydroxy-17α-(3,3,3-trifluoropropyl)-5β-androstane (VII),
(7) 7α-methyl-17β-hydroxy-17α-propyl-5β-androstane-3-one (VII),
(8) 7α-methyl-17β-hydroxy-17α-(3,3,3-trifluoropropyl)-5β-androstan-3-one (VII),
(9) 7α-methyl-19-nor-17β-hydroxy-17α-propyl-5β-androstan-3-one (VII),
(10) 7α-methyl-19-nor-17β-hydroxy-17α-(3,3,3-trifluoropropyl)-5β-androstan-3-one (VII),
(11) 2α,7α-dimethyl-17β-hydroxy-17α-propyl-5β-androstan-3-one (VII),
(12) 2α,7α-dimethyl-17β-hydroxy-17α-(3,3,3-trifluoropropyl)-5β-androstan-3-one (VII),
(13) 2α,7α-dimethyl-19-nor-17β-hydroxy-17α-propyl)-5β-androstan-3-one (VII) and
(14) 2α,7α-dimethyl-19-nor-17β-hydroxy-17α-(3,3,3-trifluoropropyl)-5β-androstan-3-one (VII).

Following the procedure of Example 30(b) but substituting for the starting material employed therein the following compounds:

(1) 7α-methyl-17β-hydroxy-17α-ethynyl-5β-androstane (VI),
(2) 2α,7α-dimehtyl-17β-hydroxy-17α-ethynyl-5β-androstane (VI),
(3) 7α-methyl-17β-hydroxy-17α-ethynyl-5β-androstan-3-one (VI) and
(4) 2α,7α-dimethyl-17β-hydroxy-17α-ethynyl-5β-androstane-3-one (VI) yields the corresponding 17α-ethynyl counterparts of (1), (2), and (4) of Formula VII'.

Following the procedure of Example 30(b) but substituting for the starting material employed therein the following compounds:

(1) 7α-methyl-19-nor-17β-hydroxy-17α(1-propynyl)-4-androsten (VI),
(2) 2α-7α-dimehtyl-19-nor-17β-hydroxy-17α-trifluoromethyl-ethynyl-4-androstene (VI),
(3) 7α-methyl-17β-hydroxy-17α(1-propynyl)-4-androsten-3-one (VI),
(4) 2α,7α-dimethyl-19-nor-17β-hydroxy-17α-trifluoromethyl-ethynyl-4-androsten-3-one (VI) and
(5) 2α,7α-dimethyl-19-nor-3β,17β-dihydroxy-17α-ethynyl-4-androstene (VI)

yields, respectively, (1) 7α-methyl-19-nor-17β-hydroxy-17α(1-propenyl)-4-androstene (VII'),
(2) 2α,7α-dimethyl-19-nor-17β-hydroxy-17α-(3',3',3'-trifluoropropenyl)-4-androstene (VII'),
(3) 7α-methyl-19-nor-17β-hydroxy-17α(1-propenyl)-4-androsten-3-one (VII'),
(4) 2α,7α-dimethyl-17β-hydroxy-17α(3',3',3'-trifluoropropenyl)-4-androsten-3-one (VII') and
(5) 2α,7α-dimethyl-19-nor-3β,17β-dihydroxy-17α-ethenyl-4-androstene (VII').

EXAMPLE 31

7α-methyl-19-nor-17β-hydroxy-17α-ethyl-5β-androstan-3-one (VII)

A suspension of 90 mg. of 1% palladium on carbon catalyst in 50 ml. of dioxane (purified as described in Fieser, "Methods of Organic Chemistry," page 368, 2nd edition) was saturated with hydrogen at atmospheric pressure. To the dioxane suspension 300 mg. of 7α-methyl-19-nor-17β-hydroxy-17α-ethynyl - 4 - androsten - 3-one, prepared as in Example 28, was added and hydrogenated at atmospheric pressure until two equivalents of hydrogen was consumed. The reaction mixture was filtered through a bed of Celite (diatomaceous earth), the filtrate concentrated to dryness and chromatographed through a 100 g. column of Florisil packed wet with Skellysolve B. Elution by a gradient technique employing between 4 l. of 2% acetone-Skellysolve B and 4 l. of 8% acetone-Skellysolve B, collecting 250 ml. fractions, gave the desired product as an oil in Fractions 21 to 30. The oil was crystallized twice from a mixture of Skellysolve B and ether to give 160 mg. of 7α-methyl-19-nor-17β-hydroxy-17α-ethyl-4-androsten-3-one, melting at 132 to 135° C., $\lambda_{max}^{alc.}$ 241 mμ (ε=11,200)

An analytical sample from another run melted at 138 to 139° C., $\lambda_{max}^{alc.}$ 241 mμ (ε=17,000)

Analysis.—Calcd. for $C_{21}H_{32}O_2$: C, 79.69; H, 10.09. Found: C, 79.42; H, 10.23.

Fractions 13, 14 and 15 were combined and recrystallized from Skellysolve B to give 10 mg. of 7α-methyl-19-nor-17β-hydroxy-17α-ethyl-5β-androstan-3-one (VII) melting at 108 to 113° C. The optical rotatory dispersion and infrared absorption spectra of the compound confirmed its identity.

In the same manner as shown for preparing the various 17α-alkyl compounds (VII) from their 17α-alkynyl counterparts (VI) appearing after Example 30 by the substitution of appropriate starting materials and by following the procedure of the aforesaid example, similar substitution of the same 17α-alkynyl starting steroids (VI) and employment of the procedure of Example 31, likewise produces the corresponding 17α-alkyl-Δ⁴-compounds and in addition the corresponding 17α-alkyl-5β-androstane derivatives (VII).

By following the procedure of Example 30(a), but employing three equivalents of hydrogen instead of two, gives 7α-methyl-19-nor-17β-hydroxy-17α-ethyl-5β-androstan-3-one (VII), exclusively. By following this procedure and employing the starting materials disclosed in the immediately preceding paragraph, the corresponding 17α-alkyl-5β-androstane derivatives will be produced exclusively, without any of the 17α-alkyl-Δ⁴-compounds.

EXAMPLE 32

7α,17α-dimethyl-19-nor-17β-hydroxy-5β-androstane (VIII)

A solution of 2 g. of 7α-methyl-19-nor-5β-androstan-17-one (V) (prepared as in Example 27) in 100 ml. of 2 N methylmagnesium bromide in a mixture of equal volumes of benzene and tetrahydrofuran, is heated under reflux for about 18 hours. Most of the solvent is evaporated with a stream of nitrogen. The concentrate is poured into ice-water, acidified with dilute hydrochloric acid and extracted with ether. The extract is washed with sodium bicarbonate solution, water, dried and the solvent removed. It is chromatographed through a 150 g. column of neutral alumina. Unreacted starting material (VI) is eluted first. The desired product is then eluted and crystallized from aqueous acetone to give 7α,17α-dimethyl-19-nor-17β-hydroxy-5β-androstane (VIII).

Following the procedure of Example 32 but substituting the methylmagnesium bromide, the following Grignard reagents:

(1) ethylmagnesium bromide (or chloride),
(2) n-propylmagnesium bromide (or chloride),
(3) isopropylmagnesium bromide (or chloride), and,
(4) n-butylmagnesium bromide (or chloride)

yields, respectively, (1) 7α-methyl-17α-ethyl-19-nor-17β-hydroxy-5β-androstane (VIII),
(2) 7α-methyl-17α-n-propyl-19-nor-17β-hydroxy-5β-androstane (VIII), (3) 7α-methyl-17α-isopropyl-19-nor-17β-hydroxy-5β-androstane (VIII), and
(4) 7α-methyl-17α-n-butyl-19-nor-17β-hydroxy-5β-androstane (VIII).

Following the procedure of Example 32 and the paragraph immediately preceding the present one, reaction of the following pairs of starting materials and Grignard reagents:

(1) 7α-methyl-19-nor-5β-androstane-3,17-dione 3-pyrrolidinyl enamine (prepared as in the third paragraph following Example 28) and ethylmagnesium bromide,
(2) 7α-methyl-5β-androstane-3,17-dione 3-pyrrolidinyl enamine and n-propylmagnesium bromide,
(3) 2α,7α-dimethyl-19-nor-5β-androstane-3,17-dione 3-pyrrolidinyl enamine and methylmagnesium bromide,
(4) 2α,7α-dimethyl-5β-androstane-3,17-dione 3-pyrrolidinyl enamine and methylmagnesium bromide, followed by hydrolyzing the products with a base, yields, respectively, (1) 7α-methyl-17α-ethyl-19-nor-17β-hydroxy-5β-androstan-3-one (VIII),
(2) 7α-methyl-17α-n-propyl-17β-hydroxy-5β-androstan-3-one (VIII),
(3) 2α,7α,17α-trimethyl-19-nor-17β-hydroxy-5β-androstan-3-one (VIII), and
(4) 2α,7α,17α-trimethyl-17β-hydroxy-5β-androstan-3-one (VIII).

Following the procedure of Example 32 and the paragraph thereafter, reaction of the following pairs of starting materials and Grignard reagents:

(1) 7α-methyl-5β-androstan-17-one (V) and isopropyl magnesium bromide,
(2) 7α-methyl-5β-androstan-17-one (V) and n-butyl-magnesium bromide,
(3) 2α,7α-dimethyl-19-nor-5β-androstan-17-one (V) and methylmagnesium bromide acid, and
(4) 2α,7α-dimethyl-5β-androstan-17-one (V) and ethylmagnesium bromide, yields, respectively, (1) 7α-methyl-17α-isopropyl-17β-hydroxy-5β-androstane (VIII),
(2) 7α-methyl-17α-n-butyl-17β-hydroxy-5β-androstane (VIII),
(3) 2α,7α-17α-trimethyl-19-nor-17β-hydroxy-5β-androstane (VIII) and
(4) 2α,7α-dimethyl-17α-ethyl-17β-hydroxy-5β-androstane (VIII).

The 7α-methyl (and 2α,7α-dimethyl)-17α-alkyl-17β-hydroxy compounds (VIII) produced in Example 32 and the three paragraphs immediately above, can be converted to their corresponding 17-acylates by following the procedures of Example 6 and the paragraphs thereafter.

EXAMPLE 33

2α,7α,17α-trimethyl-3α,17β-dihydroxy-5β-androstane (VIII')

To a solution of 1 g. of 2α,7α-17α-trimethyl-17β-hydroxy-5β-androstan-3-one (VIII) (prepared as in the second paragraph following Example 32) in 100 ml. of tetrahydrofuran, 1.5 g. of lithium aluminum tri-t-butoxyhydride is added at 0° C. with stirring. The reaction mixture is stored at about −15° C. for about 18 hours. Dilute acetic acid is added until the inorganic materials coagulate. The organic phase is decanted, dried over magnesium sulfate, filtered, concentrated to dryness, dissolved in an organic solvent and purified by chromatography with a Florisil column to yield pure 2α,7α,17α-trimethyl-3α,17β-dihydroxy-5β-androstane (VIII').

Following the procedure of Example 33, but substituting the following representative starting materials:

(1) 7α-methyl-17α-ethyl-19-nor-17β-hydroxy-5β-androstan-3-one (VIII),
(2) 7α-methyl-17α-n-propyl-17β-hydroxy-5β-androstan-3-one (VIII) and
(3) 2α,7α,17α-trimethyl-19-nor-17β-hydroxy-5β-androstan-3-one (VIII), yields, respectively, (1) 7α-methyl-17α-ethyl-19-nor-3α,17β-dihydroxy-5β-androstane (VIII'),
(2) 7α-methyl-17α-n-propyl-3α,17β-dihydroxy-5β-androstane (VIII') and
(3) 2α,7α,17α-trimethyl-19-nor-3α,17β-dihydroxy-5β-androstane (VIII').

EXAMPLE 34

7α-methyl-19-nor-3α,17β-dihydroxy-17α-ethyl-5β-androstane (VII')

Following the procedure of Example 33, but substituting 7α - methyl-19-nor-17β-hydroxy-17α-ethyl-5β-androstane-3-one (VII) (from Example 31) as starting material, yields 7α-methyl-19-nor-3α,17β-dihydroxy-17α-ethyl-5β-androstane (VII').

Following the procedure of Example 34 but substituting the following representative starting materials:

(1) 2α,7α-dimethyl-19-nor-17β-hydroxy-17α-ethyl-5β-androstan-3-one (VII),
(2) 2α,7α-dimethyl-17β-hydroxy-17α-ethyl-5β-androstan-3-one (VII) and
(3) 7α-methyl-17β-hydroxy-17α-ethyl-5β-androstan-3-one (VII), yields, respectively, (1) 2α,7α-dimethyl-19-nor-3α,17β-dihydroxy-17α-ethyl-5β-androstane (VII'),
(2) 2α,7α-dimethyl-3α,17β-dihydroxy-17α-ethyl-5β-androstane (VII') and
(3) 7α-methyl-3α,17β-dihydroxy-17α-ethyl-5β-androstane (VII').

EXAMPLE 35

7α-methyl-3α,17β-dihydroxy-17α-ethynyl-5β-androstane (VI')

Following the procedure of Example 33, but substituting 7α-methyl - 17β-hydroxy - 17α-ethynyl - 5β-androstan-3-one (VI) (prepared as in the fourth paragraph following Example 28) as starting material, yields 7α-methyl-3α,17β-dihydroxy-17α-ethynyl-5β-androstane (VI').

Following the proceudre of Example 35, but substituting the following representative starting materials:

(1) 7α-methyl-17β-hydroxy-17α(1-propynyl)-5β-androstane-3-one (VI),
(2) 7α-methyl-17β-hydroxy-17α-bromoethynyl-5β-androstane-3-one (VI),
(3) 2α,7α-dimethyl-17β-hydroxy-17α-ethynyl-5β-androstane-3-one (VI),
(4) 2α,7α-dimethyl-19-nor-17β-hydroxy-17α-chloroethynl-5β-androstan-3-one (VI), and
(5) 2α,7α-dimethyl-19-nor-17β-hydroxy-17α-trifluoromethylethynyl-5β-androstan-3-one (VI), yields, respectively, (1) 7α-methyl-3α,17β-dihydroxy-17α(1-propynyl)-5β-androstane (VI'),
(2) 7α-methyl-3α,-17β-dihydroxy-17α-bromoethynyl-5β-androstane (VI'),
(3) 2α,7α-dimethyl-3α,17β-dihydroxy-17α-ethynyl-5β-androstane (VI'),
(4) 2α,7α-dimethyl-19-nor-3α,17β-dihydroxy-17α-ethynyl-5β-androstane (VI'), and
(5) 2α,7α-dimethyl-19-nor-3α,17β-dihydroxy-17α-ethynyl-5β-androstane (VI').

EXAMPLE 36

7α-methyl-3α-hydroxy-5β-androstan-17-one (V′)

Following the procedure of Example 2, but substituting 7α-methyl-5β-androstane-3,17-dione (V) (prepared as in the paragraph following Example 27) as starting material, yields 7α-methyl - 3α-hydroxy - 5β-androstan-17-one (V′).

Following the procedure of Example 36, but substituting the following representative starting materials:

(1) 7α-methyl-19-nor-5β-androstane-3,17-dione (V),
(2) 2α,7α-dimethyl-5β-androstane-3,17-dione (V) and
(3) 2α,7α-dimethyl-19-nor-5β-androstane-3,17-dione (V), yields, respectively, (1) 7α-methyl-19-nor-3α-hydroxy-5β-androstan-17-one (V′),
(2) 2α,7α-dimethyl-3α-hydroxy-5β-androstan-17-one (V′) and
(3) 2α,7α-dimethyl-19-nor-3α-hydroxy-5β-androstan-17-one (V′).

EXAMPLE 37

7α-methyl-3α,17β-dihydroxy-5β-androstane (II′)

Following the procedure of Example 33, but substituting 7α-methyl-17β-hydroxy-5β-androstan-3-one (II) (prepared as in Example 1) as starting material, yields 7α-methyl-3α,17β-dihydroxy-5β-androstane (II′).

Following the procedure of Example 37, but substituting the following representative starting materials:

(1) 7α-methyl-19-nor-17β-hydroxy-5β-androstan-3-one (II),
(2) 2α,7α-dimethyl-17β-hydroxy-5β-androstan-3-one (II) (prepared as in Example 3),
(3) 2α,7α-dimethyl-19-nor-17β-hydroxy-5β-androstan-3-one (II),
(4) 2α,7α,17α-trimethyl-17β-hydroxy-5β-androstan-3-one (II) (prepared as in Example 4) and
(5) 2α,7α,17α-trimethyl-19-nor-17β-hydroxy-5β-androstan-3-one (II), yields, respectively, (1) 7α-methyl-19-nor-3α,17β-dihydroxy-5β-androstane (II′),
(2) 2α,7α-dimethyl-3α,17β-dihydroxy-5β-androstane (II′),
(3) 2α,7α-dimethyl-19-nor-3α,17β-dihydroxy-5β-androstane (II′),
(4) 2α,7α,17α-trimethyl-3α,17β-dihydroxy-5β-androstane (II′) and
(5) 2α,7α,17α-trimethyl-19-nor-3α,17β-dihydroxy-5β-androstane (II′).

As indicated heretofore, the compounds of this invention are useful in therapy for their anabolic, anti-fertility, anti-androgenic, anti-estrogenic and hypocholesteremic (i.e., reducing blood cholesterol) activities, and particularly in the treatment of atherosclerosis and arteriosclerosis. Administration to mammals depends on the particular compound involved, severity of the condition being treated and the individual's response to the medication. In general, a dose of about 5 to 1000 mg. of each of the compounds exemplified in Examples 1–37 and embraced within Formulas II through VIII is given one to three times a day, and preferably about 50 to about 500 mg. thereof one to three times a day, in the treatment of conditions incident to the foregoing activities when incorporated in conventional pharmaceutical compositions.

The following examples illustrate the incorporation of the active ingredients of this invention in pharmaceutical formulation.

EXAMPLE 38

Compressed tablets

A lot of 10,000 compressed tablets, each containing 50 mg. of 7α-methyl-3β,17β-dihydroxy-5α-androstane is prepared from the following ingredients:

| | Gm. |
|---|---|
| 7α-methyl-3β,17β-dihydroxy-5α-androstane | 500 |
| Dicalcium phosphate | 2500 |
| Methylcellulose, U.S.P. (15 cps.) | 65 |
| Talc, bolted | 450 |
| Calcium stearate, fine powder | 35 |

The 7α-methyl - 3β,17β-dihydroxy - 5α-androstane and dicalcium phosphate are mixed well, granulated with 7.5 percent solution of methylcellulose in water, passed through a No. 8 screen and dried at 120° F. The dried granules are passed through a No. 12 screen, mixed thoroughly with the talc and stearate and compressed into tablets.

One tablet is given 3 times daily in the oral treatment of hypercholesteremia.

EXAMPLE 39

Hard gelatin capsules

A lot of 1,000 hard gelatin capsules, each containing 10 mg. of 7α-methyl-3β,17β-dihydroxy-5α-androstane is prepared from the following ingredients:

| | Gm. |
|---|---|
| 7α - methyl - 3β,17β - dihydroxy - 5α - androstane micronized | 10 |
| Lactose | 150 |
| Calcium stearate | 2 |
| Talc | 3 |

The lactose, talc and stearate are mixed well and the 7α-methyl-3β,17β-dihydroxy - 5α-androstane incorporated into the mixture. The whole is mixed well and filled into two-piece hard gelatin capsules.

The capsules are used in the reduction of cholesterol levels at a dose of 3–6 capsules daily.

EXAMPLE 40

Soft gelatin capsules

A batch of 1,000 soft gelatin capsules, each containing 50 mg. of 7α-methyl-17β-hydroxy-5α-androstan-3-one and corn oil is prepared from the following materials:

| | |
|---|---|
| 7α-methyl-17β-hydroxy-5α-androstan-3 - one micronized gm | 50 |
| Corn oil | q.s. |

A uniform dispersion of the active ingredient in the corn oil is prepared and the dispersion filled into soft gelatin capsules by conventional means.

One capsule is given three times a day in the treatment of hypercholesteremia.

EXAMPLE 41

Aqueous oral suspension

An aqueous oral suspension containing in each 5 ml. 500 mg. of 7α,17α-dimethyl-3β,17β-dihydroxy-5α-androstane is prepared from the following materials:

| | |
|---|---|
| 7α,17α - dimethyl-3β,17β - dihydroxy - 5α-androstane micronized gm | 1,000 |
| Methlyparaben U.S.P. gm | 7.5 |
| Propylparaben U.S.P. gm | 2.5 |
| Saccharin sodium gm | 12.5 |
| Cyclamate sodium gm | 2.5 |
| Glycerin ml | 3,000 |
| Tragacanth powder gm | 100 |
| Orange oil flavor gm | 10 |
| F. D. and C. orange dye gm | 7.5 |
| Deionized water, q.s. to ml | 10,000 |

37

One teaspoonful (5 ml.) three times daily is employed in the treatment of hypercholesteremia.

EXAMPLE 42

Aqueous suspension for injection

A suspending vehicle is prepared from the following materials:

| | |
|---|---|
| Polyethylene glycol 4,000 _____gm__ | 30 |
| Potassium chloride _____gm__ | 11.2 |
| Polysorbate 80 _____gm__ | 2 |
| Methylparaben _____gm__ | 1.8 |
| Propylparaben _____gm__ | 0.2 |
| Water for injection, q.s. _____ml__ | 1,000 |

The parabens are added to a major portion of the water and are dissolved therein by stirring and heating to 65° C. The resulting solution is cooled to room temperature and the remainder of the ingredients are added and dissolved. The balance of the water to make up the required volume is then added and the solution sterilized by filtration. The sterile vehicle thus prepared is then mixed with 50 gm. of 3α-hydroxy-7α-methyl-5α-androstan-17-one which has been previously reduced to a particle size less than about 10 microns and sterilized with ethylene oxide gas. The mixture is passed through a sterilized colloid mill and filled under aseptic conditions into sterile containers which are then sealed.

Each milliliter of this suspension contains 50 mg. of 7α-methyl-3α-hydroxy-5α-androstan - 17-one. The suspension is used intramuscularly in 1-mil. doses in the treatment of hypercholesteremia.

We claim:
1. Compounds of the formula

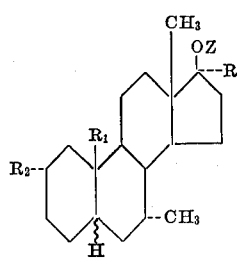

wherein R, $R_1$ and $R_2$ are selected from the group consisting of hydrogen and methyl, $\sim$ is a generic expression denoting α- and β-bonds and mixtures thereof and Z is selected from the group consisting of hydrogen and the lower acyl radical of a hydrocarbon carboxylic acid containing from one to twelve carbon atoms, inclusive.

2. 7α-methyl-17β-hydroxy-5α-androstane.
3. 7α,17α-dimethyl-17β-hydroxy-5α-androstane.
4. 7α-methyl-17β-hydroxy-5α-androstan-17-acylate.
5. 7α-methyl-17β-hydroxy-5β-androstane.
6. 2α,7α-dimethyl-17β - hydroxy - 17α-ethynyl - 5α-androstane.
7. 7α-methyl-17β-hydroxy-17α-ethyl-5α-androstane.
8. 7α-methyl-19-nor-17β-hydroxy-5α-androstane.
9. 2α,7α-dimethyl-3β,17β-dihydroxy-5α-androstane.
10. 2α,7α-dimethyl-17β-hydroxy-5α-androstan-3-one.
11. 2α,7α,17α - trimethyl - 17β-hydroxy-5α-androstan-3-one.
12. 2α,7α-dimethyl - 19 - nor-17β-hydroxy-5α-androstan-3-one.
13. 2α,7α,17α-trimethyl - 19 - nor-17β-hydroxy-5β-androstan-3-one.
14. A pharmaceutical composition for oral administration and the lowering of blood cholesterol in the treatment of hypercholesteremia comprising: about 5 to 1,000 mg. of a compound of the formula

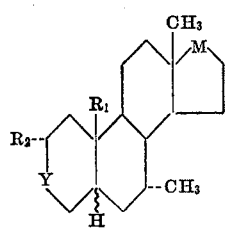

wherein $\sim$ is a generic expression denoting α- and β-bonds and mixtures thereof; $R_1$ and $R_2$ are selected from the group consisting of hydrogen and methyl; Y is selected from the group consisting of the methylene radical ($>CH_2$), the carbonyl radical ($>C=O$) and

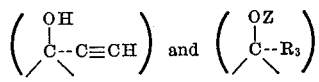

M is selected from the group consisting of

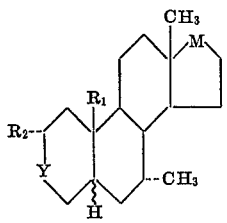

wherein $R_3$ is selected from the group consisting of hydrogen and methyl and Z is selected from the group consisting of hydrogen and lower acyl of a hydrocarbon carboxylic acid containing from one to twelve carbon atoms, dispersed in a pharmaceutical carrier.

15. A method for reducing blood cholesterol in mammals comprising: orally administering to mammals a pharmaceutical preparation comprising a major amount of an oral pharmaceutical carrier and from about 5 to about 1000 mg. of a compound of the formula

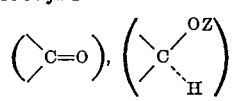

wherein $\sim$ is a generic expression denoting α- and β-bonds and mixtures thereof; $R_1$ and $R_2$ are selected from the group consisting of hydrogen and methyl; Y is selected from the group consisting of the methylene radical ($>CH_2$), the carbonyl radical

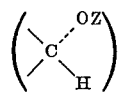

and

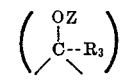

Z being selected from the group consisting of hydrogen and the lower acyl radical of a hydrocarbon carboxylic acid containing from one to twelve carbon atoms, inclusive; M is selected from the group consisting of

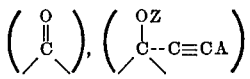

and

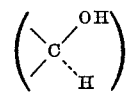

wherein A is selected from the group consisting of hydrogen, lower alkyl of from one to twelve carbon atoms, inclusive, chlorine, bromine and trifluoromethyl, $R_3$ is selected from the group consisting of hydrogen, lower alkyl of from one to twelve carbon atoms, inclusive, and alkylene of from one to twelve carbon atoms, inclusive, and Z has the same meaning as above.

References Cited

UNITED STATES PATENTS 3,262,949 7/1966 Ringold et al. _____ 260—397.3
3,300,520 1/1967 Ammer et al. _____ 260—397.3

OTHER REFERENCES

Wolff et al.: Jour. of Medicinal Chem., vol. 7, No. 5, Sept. 8, 1964, pp. 577–584.

LEWIS GOTTS, *Primary Examiner.*

J. R. BROWN, *Assistant Examiner.*